US011081018B2

(12) United States Patent
Smith Lewis et al.

(10) Patent No.: US 11,081,018 B2
(45) Date of Patent: Aug. 3, 2021

(54) PERSONALIZED LEARNING SYSTEM AND METHOD FOR THE AUTOMATED GENERATION OF STRUCTURED LEARNING ASSETS BASED ON USER DATA

(71) Applicant: Cerego LLC., San Francisco, CA (US)

(72) Inventors: Andrew Smith Lewis, Palo Alto, CA (US); Paul Mumma, Albany, CA (US); Alex Volkovitsky, San Francisco, CA (US); Iain Harlow, Pleasant Hill, CA (US); Kyle Stewart, San Francisco, CA (US)

(73) Assignee: CEREGO LLC., San Francisco, CA (US)

( * ) Notice: Subject to any disclaimer, the term of this patent is extended or adjusted under 35 U.S.C. 154(b) by 0 days.

(21) Appl. No.: 17/095,035

(22) Filed: Nov. 11, 2020

(65) Prior Publication Data

US 2021/0158712 A1    May 27, 2021

Related U.S. Application Data

(63) Continuation of application No. 15/836,631, filed on Dec. 8, 2017, now Pat. No. 10,861,344.

(60) Provisional application No. 62/452,634, filed on Jan. 31, 2017.

(51) Int. Cl.
*G09B 7/04* (2006.01)
*G09B 5/06* (2006.01)
*G09B 7/07* (2006.01)
*G09B 7/08* (2006.01)
*G09B 5/12* (2006.01)
*G06N 20/00* (2019.01)
*G06N 5/04* (2006.01)
*G09B 19/00* (2006.01)
*G06N 7/00* (2006.01)

(52) U.S. Cl.
CPC ............... *G09B 7/04* (2013.01); *G06N 5/04* (2013.01); *G06N 20/00* (2019.01); *G09B 5/065* (2013.01); *G09B 5/125* (2013.01); *G09B 7/07* (2013.01); *G09B 7/08* (2013.01); *G06N 7/005* (2013.01); *G09B 19/00* (2013.01)

(58) Field of Classification Search
CPC ...................................................... G08B 7/04
USPC ......................................................... 434/309
See application file for complete search history.

(56) References Cited

PUBLICATIONS

Smith Lewis et al., "Personalized Learning Systems and Method for the Automated Generation of Structured Learning Assets Based on User Data", U.S. Appl. No. 15/836,631, filed Dec. 8, 2017.

*Primary Examiner* — Kesha Frisby
(74) *Attorney, Agent, or Firm* — Keating and Bennett, LLP

(57) ABSTRACT

Learning systems and methods of the present disclosure include generating a text document based on a digital file, tokenizing the text document, generating a semantic model based on the tokenized text document using an unsupervised machine learning algorithm, assigning a plurality of passage scores to a corresponding plurality of passages of the tokenized text document, selecting one or more candidate knowledge items from the tokenized text document based on the plurality of passage scores, filtering the one or more candidate knowledge items based on user data, generating one or more structured learning assets based on the one or more filtered candidate knowledge items, generating an interaction based at least on the one or more structured learning assets, and transmitting the interaction to a user device. Each passage score is assigned based on a relationship between a corresponding passage and the semantic model.

20 Claims, 14 Drawing Sheets

PERSONALIZED LEARNING SYSTEM AND METHOD FOR THE AUTOMATED GENERATION OF STRUCTURED LEARNING ASSETS BASED ON USER DATA

TECHNICAL FIELD

One or more embodiments of the invention relate generally to learning systems and more particularly, for example, personalized learning systems that automate the generation of structured learning assets based on user data.

BACKGROUND

Electronic learning technologies are commonly used to help students learn, develop skills, and enhance their understanding of certain subjects. For example, electronic learning technologies may provide a convenient way to take a course online. However, these technologies often provide the same curriculum for many or all the students in the course. For example, a given course may have a common starting point and a common ending point for the students, regardless of each student's weaknesses, strengths, and/or cognitive learning abilities.

Yet, the students typically vary in the way they learn, how quickly they learn, and how they retain what they learn. As a result, the general "one-size-fits-all" approach provided to the students is often ineffective, inefficient, and/or cumbersome to the students. Students using the "one-size-fits-all" approach may apportion too much time reviewing subject matter that they know well at the expense of spending insufficient time reviewing subject matter that they know poorly. In addition, many students may be burdened with trying to identify their own weaknesses and strengths for a given subject matter. Further, students may put forth efforts in determining how to apportion their time effectively to learn the subject matter. As a result, the students may struggle with such burdens, they may not perform well on exams, and they may become discouraged, leading to attrition which is one of the most significant problems in education today.

Electronic learning technologies also commonly lack access to a broad selection of source material. For example, a given online course may be limited to the contents of a single (or several) textbooks selected for the course. Further, the online course may be limited to a subset of chapters in the textbook, such as chapters selected by an instructor. In another example, an exam preparatory course may be limited to the content owned by the provider of the course. As a result, the students may be confined to source material narrowly tailored to one (or several) out of many possible strategies for learning the subject matter. Yet, as noted, students typically vary in the way they learn, how quickly they learn, and how they retain what they learn. Thus, the limited scope of available source material may result in restricting the student's learning process.

SUMMARY

According to some embodiments, a learning system may include a non-transitory memory and one or more hardware processors configured to read instructions from the non-transitory memory to cause the system to perform operations. In some embodiments, the operations may include generating a text document based on a digital file, tokenizing the text document, generating a semantic model based on the tokenized text document using an unsupervised machine learning algorithm, assigning a plurality of passage scores to a corresponding plurality of passages of the tokenized text document, selecting one or more candidate knowledge items from the tokenized text document based on the plurality of passage scores, filtering the one or more candidate knowledge items based on user data, generating one or more structured learning assets based on the one or more filtered candidate knowledge items, generating an interaction based at least on the one or more structured learning assets, and transmitting the interaction to a user device. Each passage score may be assigned based on a relationship between a corresponding passage and the semantic model.

According to some embodiments, a method may include extracting text from digital content, performing semantic analysis of the text to generate a semantic model, scoring each passage of the text based on a relationship between the passage and the semantic model, selecting one or more candidate knowledge items from the text based on the scoring, filtering the one or more candidate knowledge items based on user data, and generating a structured learning asset based on the one or more filtered candidate knowledge items.

According to some embodiments, a non-transitory machine-readable medium may have stored thereon machine-readable instructions executable to cause a machine to perform operations. In some examples, the operations may include generating a text document based on received digital content, tokenizing the text document, performing semantic analysis of the tokenized text document to generate a semantic model, scoring each passage of the tokenized text document based on a relationship between the passage and the semantic model, selecting one or more candidate knowledge items from the tokenized text document based on the scoring, filtering the one or more candidate knowledge items based on user data, and generating a structured learning asset based on the one or more filtered candidate knowledge items.

DETAILED DESCRIPTION

Figure 1A:
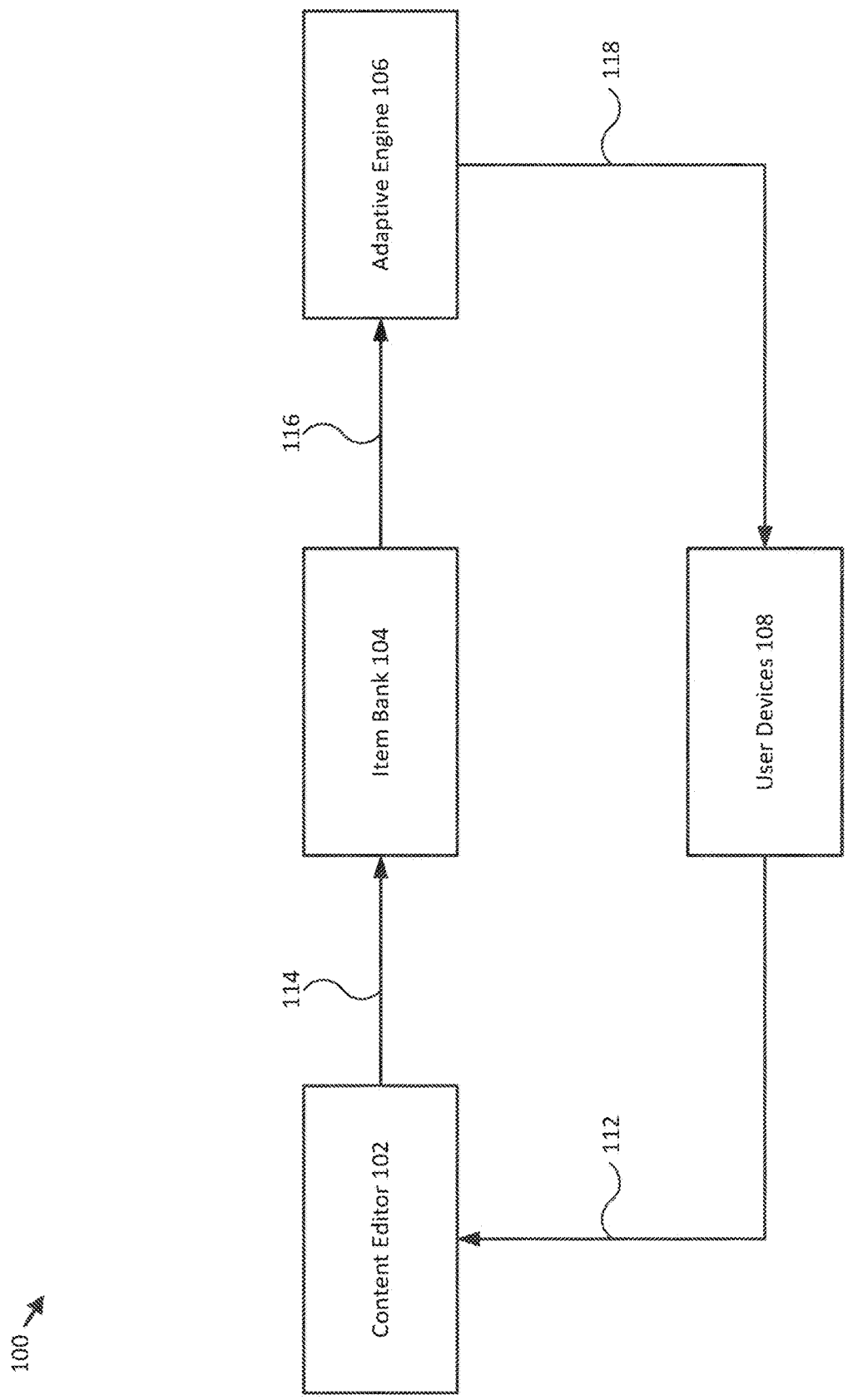
FIGS. 1A and 1B are simplified diagrams of a learning system according to some embodiments.
Figure 1B:
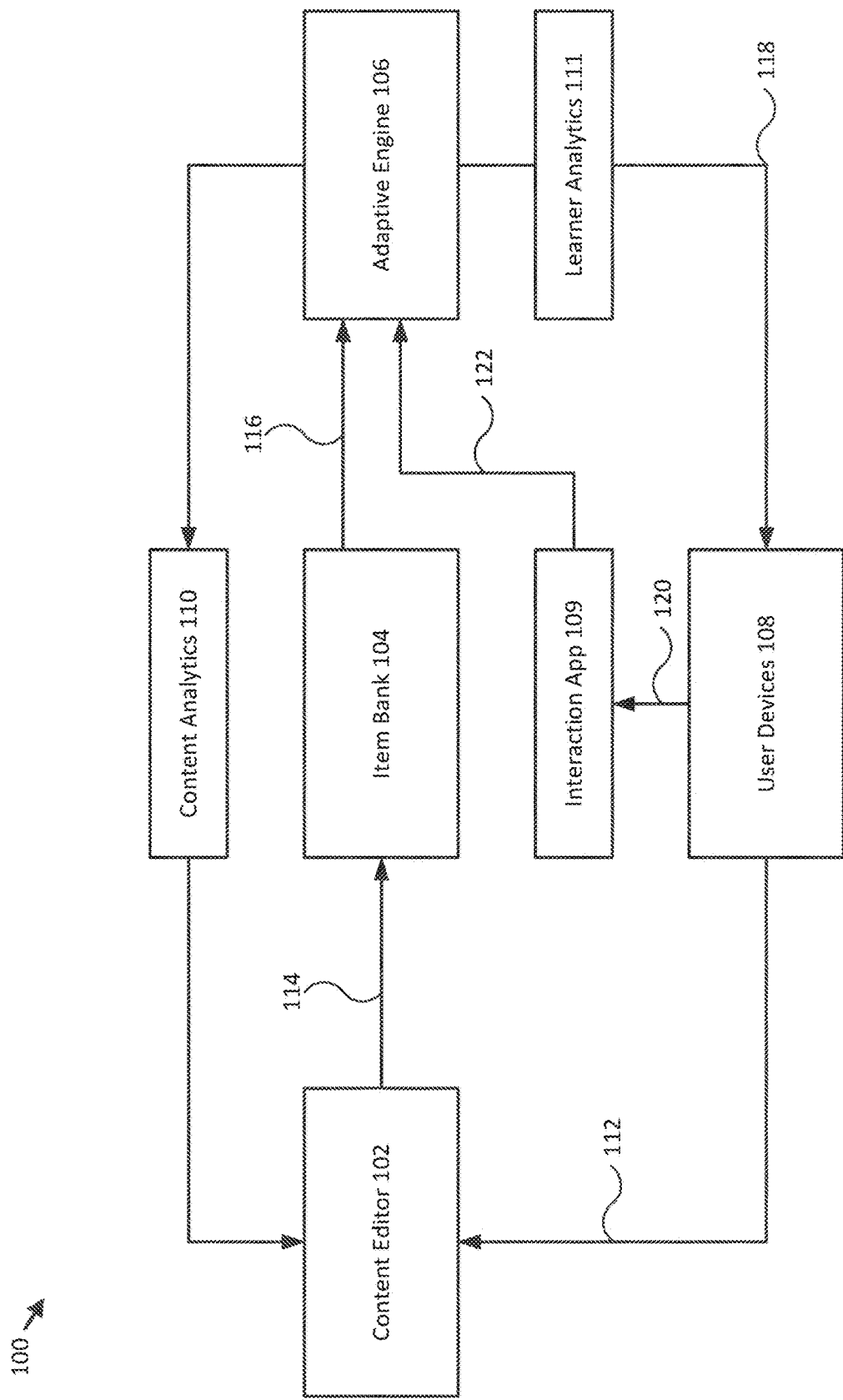

FIGS. 1A and 1B are simplified diagrams of a learning system 100 according to some embodiments. FIG. 1A illustrates a block diagram of learning system 100 including content editor 102, knowledge item bank 104, adaptive engine 106, and user devices 108. In one embodiment, learning system 100 may be implemented with a variety of electronic learning technologies. For example, learning system 100 may be implemented with web and/or mobile online courses, exam preparatory courses, and foundational courses involving large amounts of materials or contents, such as courses teaching medicine, dentistry, law, engineering, aviation, and/or other disciplines. Yet, learning system 100 may be implemented through kindergarten courses, elementary school courses, high school courses, and also through college courses as well. Yet further, learning system 100 may be implemented with institutional training courses (e.g., training courses used by businesses, corporations, governments, and/or military entities) and/or professional training courses, such as courses to obtain professional certifications (e.g., emergency technician certifications).

In one embodiment, learning system 100 may be implemented to improve various electronic learning technologies. For example, learning system 100 may improve the technologies to adapt to each student's weaknesses, strengths, and/or cognitive learning abilities. In particular, learning system 100 may generate individualized sessions for each student to study materials over time, thereby building long-term retention as opposed to cramming to provide short-term retention followed by a loss of the retention. Learning system 100 may also effectively optimize each student's time spent studying based on the student's learning progressions. For example, learning system 100 may determine when each student is apt to learn and retain information. For example, learning system 100 may determine a student is apt to learn in the morning versus in the afternoon, among other possibilities.

In another embodiment, learning system 100 may improve electronic learning technologies by resolving challenges described herein regarding courses being limited to certain contents selected for the course. Learning system 100 may have the capability to integrate with a growing library of digital source materials including, for example, multiple text books, a collection of portable document formats (PDFs), content images, multimedia videos, audio content, and/or other resources with a combination of the materials described herein. For example, learning system 100 may be used with one hundred text books from a first publisher, fifty text books from a second publisher, twenty textbooks from a third publisher, and thirty text books from a fourth publisher, among other contents from a combination of multiple publishers. In one example, learning system 100 may be capable of integrating with electronic reader applications to provide the personalized learning processes in numerous types of mobile electronic devices, including tablet devices, electronic reader devices, and/or personal computing devices.

As further described herein, content editor 102 may be a content editor processor in wired or wireless communication with user devices 108, possibly including instructor and/or learner devices. In particular, content editor 102 may be in communication with a network (e.g., a base station network) that is also in wireless communication with user devices 108. Such wireless communication may be implemented in accordance with various wireless technologies including, for example, code division multiple access (CDMA), Long Term Evolution (LTE), Global System for Mobile Communications (GSM™), or other standardized or proprietary wireless communication techniques. In another example, the wireless communication may be implemented with short-range wireless technologies, such as Wi-Fi™. Bluetooth™, or other standardized or proprietary wireless communication techniques.

Content editor 102 may be implemented to receive, retrieve, and process content 112 from user devices 108, such as learner devices and/or instructor devices. Content 112 may be a content data packet that includes texts from digital source materials, possibly including texts from electronic textbooks, where the texts may be highlighted by one or more users. In one embodiment, highlighted materials may include marked digital source materials, such as underlined, bolded, and/or italicized text or content, among other markings discussed further herein. In one example, content 112 may include figures, images, videos, and/or audio contents. In one embodiment, content editor 102 may identify and transmit a set of knowledge items 114 based on content 112. Knowledge items 114 may be objects and/or the building blocks of the learning processes as further described herein. Content editor 102 may transfer knowledge items 114 to knowledge item bank 104 to store knowledge items 114.

Adaptive engine 106 may retrieve knowledge items 116 from knowledge item bank 104. Adaptive engine 106 may also be in wired or wireless communication with user devices 108, possibly including instructor and/or learner devices. In particular, adaptive engine 106 may be in communication with a network (e.g., a base station network) that is also in wireless communication with user devices 108. Such wireless communication may be implemented in accordance with various wireless technologies including, for example, CDMA, LTE. GSM™, or other standardized or proprietary wireless communication techniques. In another example, the wireless communication may be implemented with short-range wireless technologies, such as Wi-Fi™, Bluetooth™, or other standardized or proprietary wireless communication techniques.

Adaptive engine 106 may create and transmit interactions 118 to user devices 108. In one embodiment, adaptive engine 106 may generate interactions 118 based on knowledge items 116 and transmit interactions 118 to user devices 108 for the learners to respond. In one example, adaptive engine 106 may determine the modality of interactions 118, such as a multiple choice question, a matching question, and/or a fill-in-the-blank question. In another example, adaptive engine 106 may determine a schedule to identify when to transmit interactions 118 to user devices 108 for the learners to respond. In particular, adaptive engine 106 may determine when a learner is apt to learn and retain information. In one example, adaptive engine 106 may transmit interactions 118 during learning sessions (e.g., intra trial) and/or between learning sessions (e.g., inter trial).

In various embodiments, learning system 100 may operate a feedback loop with content editor 102, knowledge item bank 104, adaptive engine 106, and user devices 108. In one embodiment, user devices 108 may transmit content 112 to content editor 102. Content editor 102 may generate and transmit knowledge items 114 based on content 112. Knowledge item bank 104 may store knowledge items 114. Adaptive engine 106 may generate and transmit interactions 118 based on stored items 116, and the process may continue accordingly. In one example, adaptive engine 106 may determine which interactions 118 to generate and when to transmit interactions 118 to user devices 108 based on content 112 received from user devices 108.

FIG. 1B illustrates a block diagram of learning system 100 further including interaction applications 109, content analytics data 110, and learner analytics data 111 in accordance with an embodiment of the disclosure. FIG. 1B further illustrates content editor 102, knowledge item bank 104, and adaptive engine 106 as further described herein.

In one embodiment, each of user devices 108 may have installed a respective interaction application 109. Respective interaction applications 109 may be displayed on user devices 108 and respective interactions 118 may be provided by adaptive engine 106. Based on respective interactions 118 provided, respective user inputs 120 may be provided with each interaction application 109. For example, based on respective user inputs 120, respective responses 122 may be generated and transmitted to adaptive engine 106. In one embodiment, there may be a continuous cycle with adaptive engine 106, interactions 118, and responses 122 from user devices 108 driven by the learning processes with respective interaction applications 109.

In one embodiment, adaptive engine 106 may generate and transmit respective learner analytics data 111 to each device of user devices 108. Respective learner analytics data 111 may inform each learner regarding the learner's performance and/or performance results based on respective responses 122 to respective interactions 118. In one example, learner analytics data 111 may be transmitted to user device 108, e.g., an instructor device, to inform the instructor regarding the learners' performances, group performances, and/or class performances and progressions, among other indicators of one or more classes. In one embodiment, the instructor may be an educator, a teacher, a lecturer, a professor, a tutor, a trainer, and/or a manager, among other possible individuals.

In one embodiment, adaptive engine 106 may generate content analytics data 110 based on the respective responses 122 from each interaction application 109 of user devices 108. Content analytics data 110 may indicate performance results based on the respective responses 122. In particular, content analytics data 110 may indicate how the learners are performing, whether the learners are retaining information associated with knowledge items 116, and/or whether the learners are progressing accordingly. Content analytics data 110 may be transmitted to content editor 102. In one example, content editor 102 may generate additional knowledge items 114 based on content analytics data 110.

In one embodiment, content analytics data 110 may inform content creators, publishers, and/or instructors regarding how the learners perform based on responses 122. Content analytics data 110 may indicate knowledge items 116 that learners may understand well and also knowledge items 116 that may be challenging to learners. For example, content analytics data 110 may be used to generate a copy of digital source materials, such as electronic textbooks, that illustrate knowledge items 116 that may be challenging to learners. Such analytics data 110 may improve electronic learning technologies by providing challenging items 116 in digital source materials, such as text books. In some example, learners are able to review digital source materials, such as text books, while also viewing challenging knowledge items 116 of the materials.

Figure 2A:
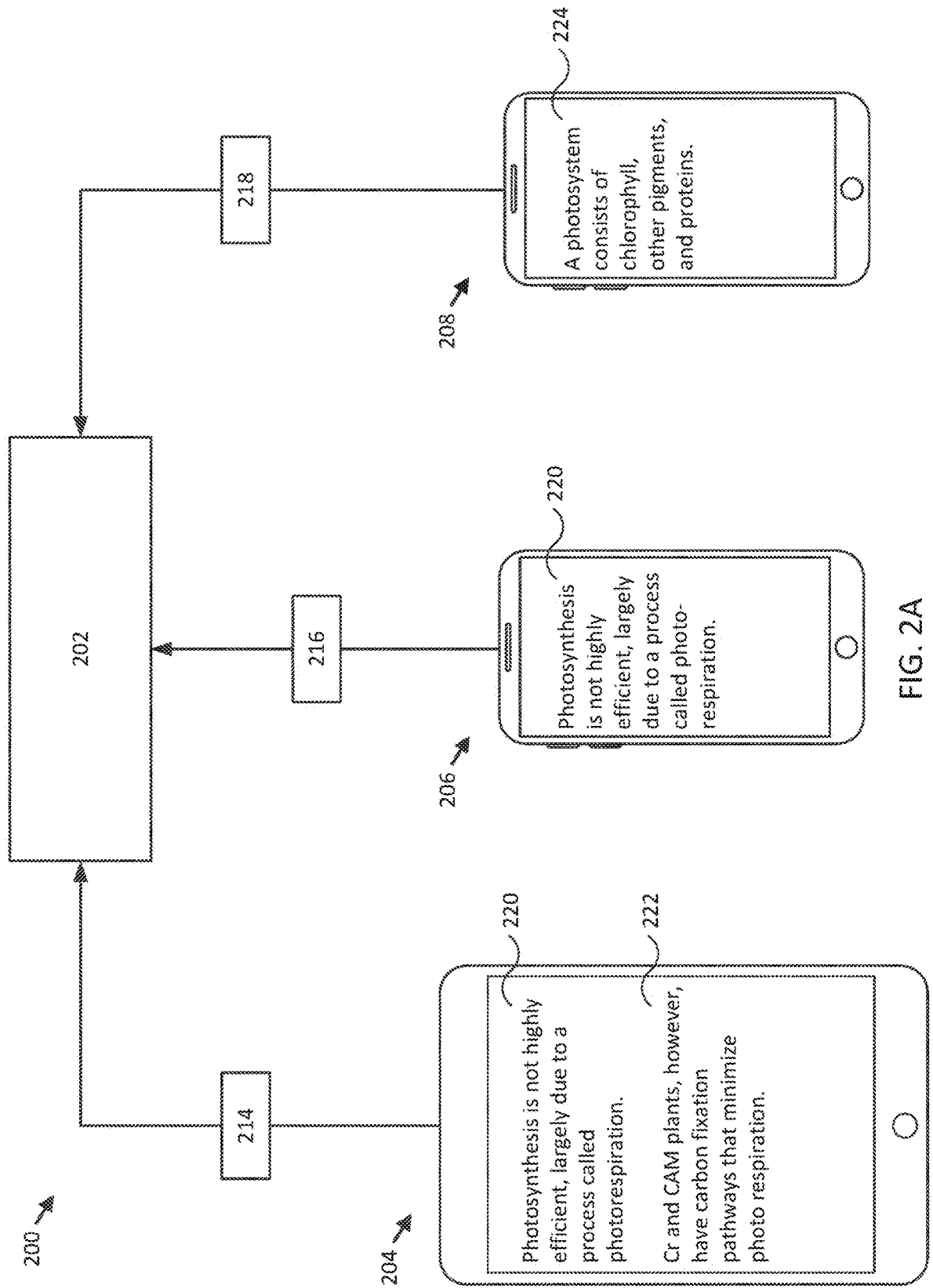
FIGS. 2A-2C are simplified diagrams of a learning system and an instructor device according to some embodiments.
Figure 2B:
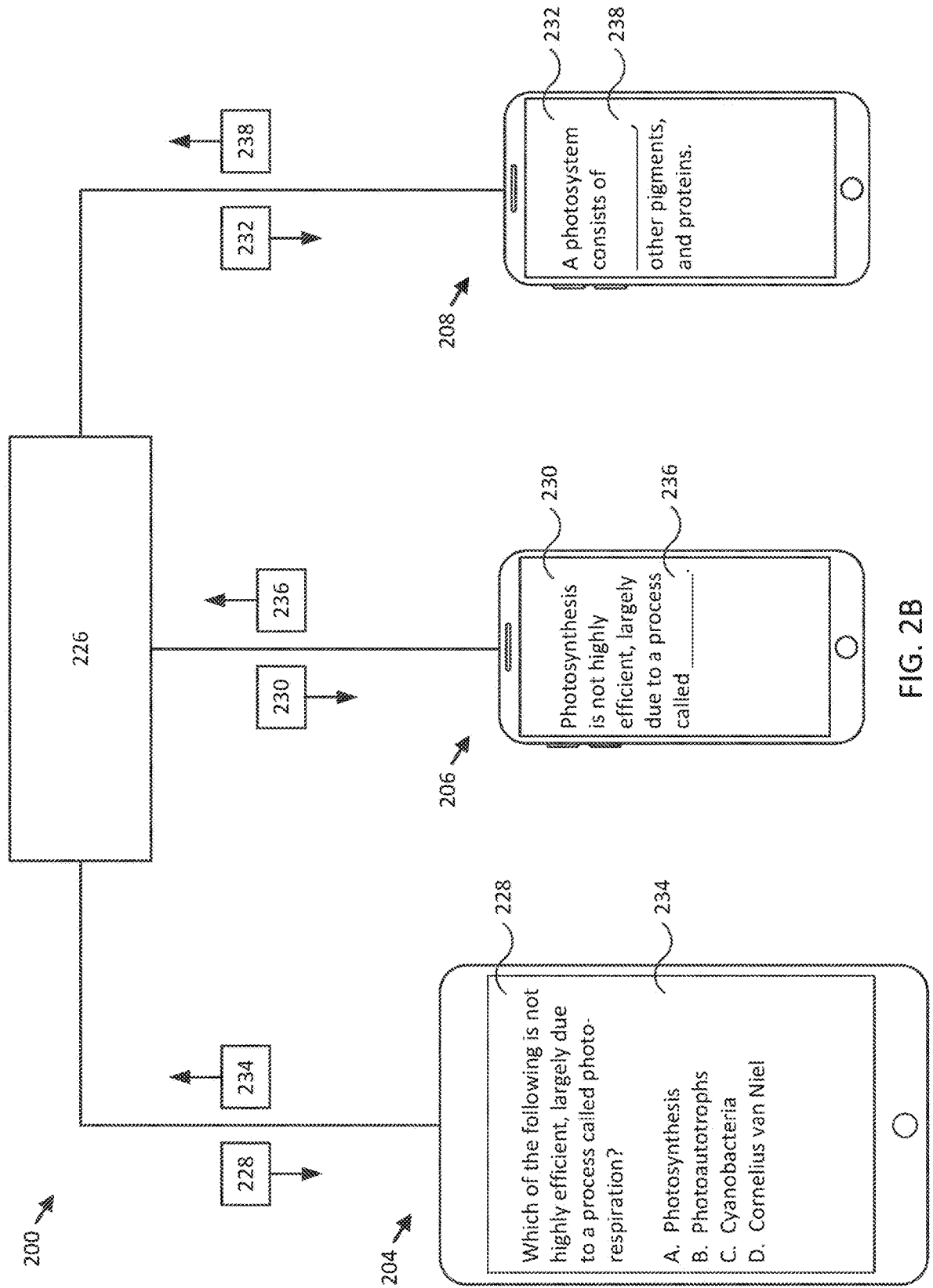
Figure 2C:
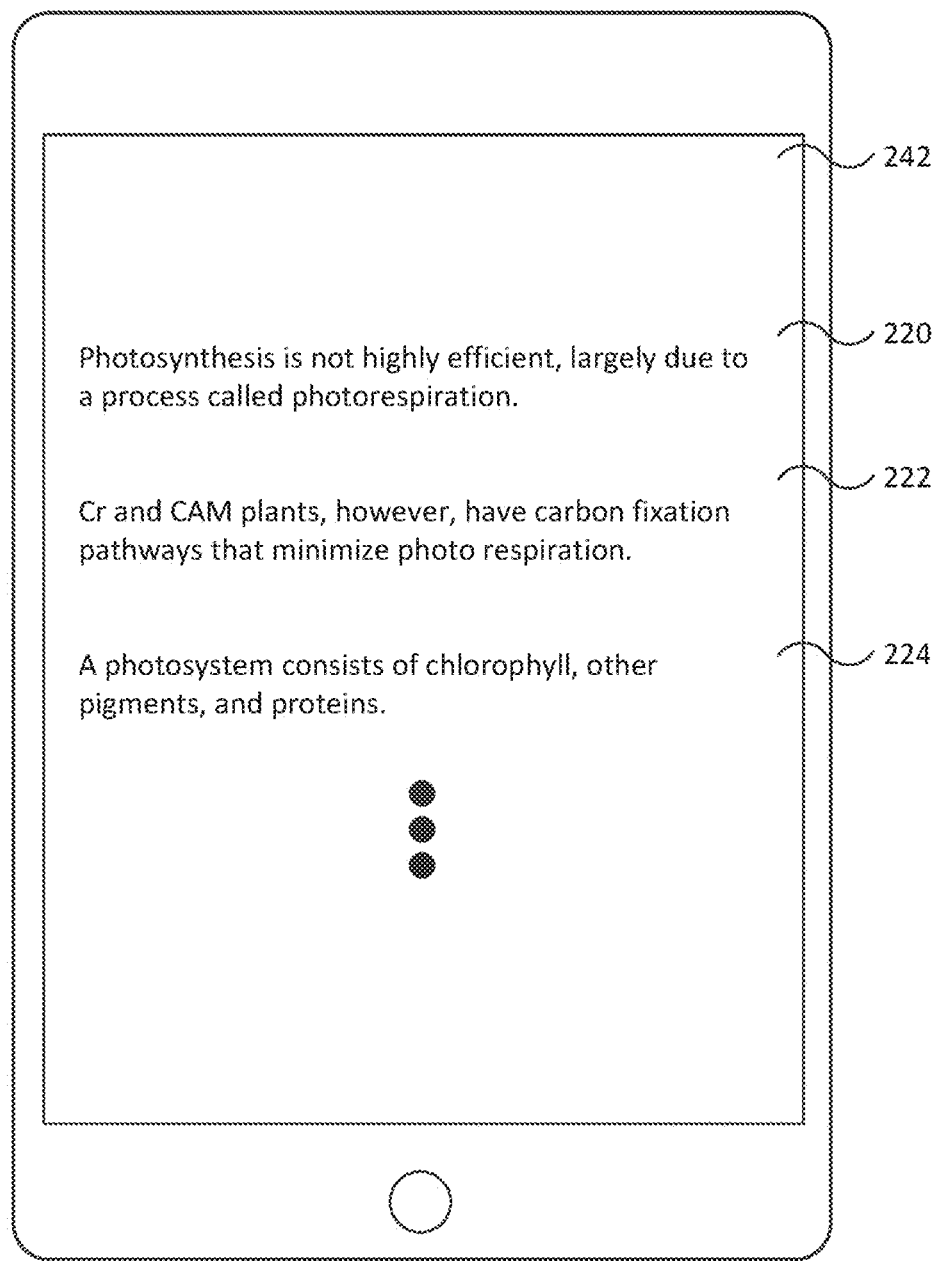

FIGS. 2A-2C are simplified diagrams of a learning system 200 and an instructor device 240 according to some embodiments. FIG. 2A illustrates a block diagram of learning system 200 including learner devices 204, 206, and 208. The various components identified in learning system 100 may be used to provide various features in learning system 200 in one embodiment. In particular, content editor 202 may take the form of content editor 102 as further described herein.

Learner device 204 may be a tablet device that displays knowledge items 220 and 222. Knowledge item 220 may provide. "Photosynthesis is not highly efficient, largely due to a process called photorespiration." Knowledge item 222 may provide, "Cr and CAM plants, however, have carbon fixation pathways that minimize photo respiration." In one embodiment, learner device 204 may include an interaction application, such as interaction application 109, that displays and highlights knowledge items 220 and 222, among other contents. For example, a learner may highlight knowledge items 220 and 222 with the interaction application. Learner device 204 may generate and transmit content 214 to content editor 202. For example, content 214 may be a content data packet that includes knowledge items 220 and 222. As a result, content editor 202 may identify knowledge items 220 and 222 from digital source materials as further described herein.

Learner device 206 may be a smartphone that displays knowledge item 220. Knowledge item 220 may provide, "Photosynthesis is not highly efficient, largely due to a process called photorespiration." In one embodiment, learner device 206 may include an interaction application, such as, for example, interaction application 109, that displays and highlights knowledge item 220 among other content. For example, a learner may highlight knowledge item 220 with the interaction application. Learner device 206 may generate and transmit content 216 to content editor 202. For example, content 216 may be a content data packet that includes knowledge item 220. As a result, content editor 202 may identify knowledge item 220 from the digital source materials as further described herein.

Learner device 208 may be a smartphone that displays knowledge item 224. Knowledge item 224 may provide. "A photosystem consists of chlorophyll, other pigments, and proteins." In one embodiment, learner device 208 may include an interaction application, such as, for example, interaction application 109, that displays and highlights knowledge item 224 among other content. For example, a learner may highlight knowledge item 224 with the interaction application. Learner device 208 may generate and transmit digital content 218 to content editor 202. For example, content 218 may be a content data packet that includes knowledge item 224. As a result, content editor 202 may identify knowledge item 224 from the digital source materials as further described herein.

FIG. 2B illustrates a block diagram of learning system 200 further including adaptive engine 226 in accordance with an embodiment of the disclosure. The various components identified in learning system 100 may be used to provide various features in learning system 200 in one embodiment. For example, adaptive engine 226 may take the form of adaptive engine 106 as further described herein.

Adaptive engine 226 may generate and transmit interaction 228 to learner device 204. For example, interaction 228 may be generated based on knowledge items 220 and 222 received by learner device 204 and identified by content editor 202 from the digital source materials as further described herein. In one embodiment, interaction 228 may be a multiple choice question that provides. "Which of the following is not highly efficient, largely due to a process called photo-respiration? A. Photosynthesis, B. Photoautotrophs. C. Cyanobacteria, and D. Cornelius van Niel." As noted, learner device 204 may include an interaction application, such as, for example, interaction application 109, that displays interaction 228. In one example, the interaction application may receive a learner input that indicates response 234 including a selection of A. B. C, or D. For example, response 234 may include the correct answer with the selection of A. As a result, response 234 may be transmitted to adaptive engine 226. Adaptive engine 226 may generate and transmit interaction 230 to learner device 206. Interaction 230 may be generated based on knowledge item 220 received by learner device 206 and identified by content editor 202 from the digital source materials as further described herein. In one embodiment, interaction 230 may be a fill-in-the-blank question that provides, "Photosynthesis is not highly efficient, largely due to a process called." As noted, learner device 206 may include an interaction application, such as, for example, interaction application 109, that displays interaction 230. In one example, the interaction application may receive a learner input that indicates response 236. For example, response 236 may include the correct answer of "photo-respiration." As a result, response 236 may be transmitted to adaptive engine 226.

Adaptive engine 226 may generate and transmit interaction 232 to learner device 208. Interaction 232 may be generated based on knowledge item 224 received by learner device 208 and identified by content editor 202 from the digital source materials as further described herein. In one embodiment, interaction 232 may be a fill-in-the-blank question and/or interaction that provides, "A photosystem consists of _____, other pigments, and proteins." As noted, learner device 208 may include an interaction application, such as, for example, interaction application 109, that displays interaction 232. In one example, the interaction application may receive a learner input that indicates response 238. For example, response 238 may include "chloroplast" instead of the correct answer "chlorophyll" and may be transmitted to adaptive engine 226.

FIG. 2C illustrates instructor device 240 in accordance with an embodiment of the disclosure. The various components identified in learning systems 100 and 200 may be used to provide various features of instructor device 240 in one embodiment. For example, instructor device 240 may take the form of one user device 108. In one example, instructor device 240 may display an electronic copy of digital source materials 242. Knowledge item 220 displayed by learner devices 204 and 206 may also be displayed by instructor device 240. Knowledge item 222 displayed by learner device 204 may also be displayed by instructor device 240. Knowledge item 224 displayed by learner device 208 may also be displayed by instructor device 240. In one embodiment, knowledge items 220, 222, and 224 may be displayed based on content analytics data such as, for example, content analytics data 110 from adaptive engine 106. For example, content editor 102 may generate knowledge items 220, 222, and 224 for display on instructor device 240 based on content analytics data 110.

Knowledge item 220 may be highlighted and displayed by instructor device 240. For example, knowledge item 220 may be highlighted based on responses 234 and 236 including correct answers of the selection A and the fill-in-the-blank "photorespiration." respectively. In one example, knowledge item 220 may be highlighted and displayed by instructor device 240 with a first color, such as, a green color that indicates the learners' understanding of knowledge item 220.

Knowledge item 222 may also be displayed by instructor device 240. For example, knowledge item 222 may be displayed without highlights, possibly based on the learner's not having been tested on knowledge item 222.

Knowledge item 224 may be highlighted and displayed by instructor device 240. For example, knowledge item 224 may be highlighted based on response 234 including an incorrect answer "chloroplast" instead of the correct answer "chlorophyll". In one example, knowledge item 224 may be highlighted with a second color, such as, a red color that indicates the learner's understanding or lack of understanding of knowledge item 224. Knowledge items 220, 222, and 224, among other knowledge items contemplated in FIG. 2C, may provide an instructor with an indication of learner weaknesses, strengths, and how to apportion class and studying time effectively. Such knowledge items, highlighted and/or not highlighted, may improve electronic learning technologies by providing challenging knowledge items, such as knowledge item 224, in digital source materials 242 in one or more highlights. In some example, instructors are able to review digital source materials 242, such as text books, while also viewing challenging knowledge items 224 in digital source materials 242 with one or more highlights.

In one example, knowledge items 220, 222, and 224, among other knowledge items, may be displayed and highlighted on learner device 204 based on response 234. In particular, knowledge item 220 may be highlighted in green based on response 234 and knowledge items 222 and 224 may not be highlighted since they may not have yet been tested. In another example, knowledge items 220, 222, and 224, among other knowledge items, may be displayed and highlighted on learner device 206 based on response 236. In particular, knowledge item 220 may be highlighted in green and knowledge items 222 and 224 may not be highlighted since they may not have yet been tested. In another example, knowledge items 220, 222, and 224, among other knowledge items, may be displayed and highlighted on learner device 208 based on response 238. In particular, knowledge items 220 and 222 may not be highlighted since they may not have yet been tested and knowledge item 224 may be highlighted in red based on incorrect response 238. As a result, learner devices 204, 206, and 208 may provide the respective learners with an indication of each learner's weaknesses, strengths, and how to apportion studying time effectively.

Figure 3A:
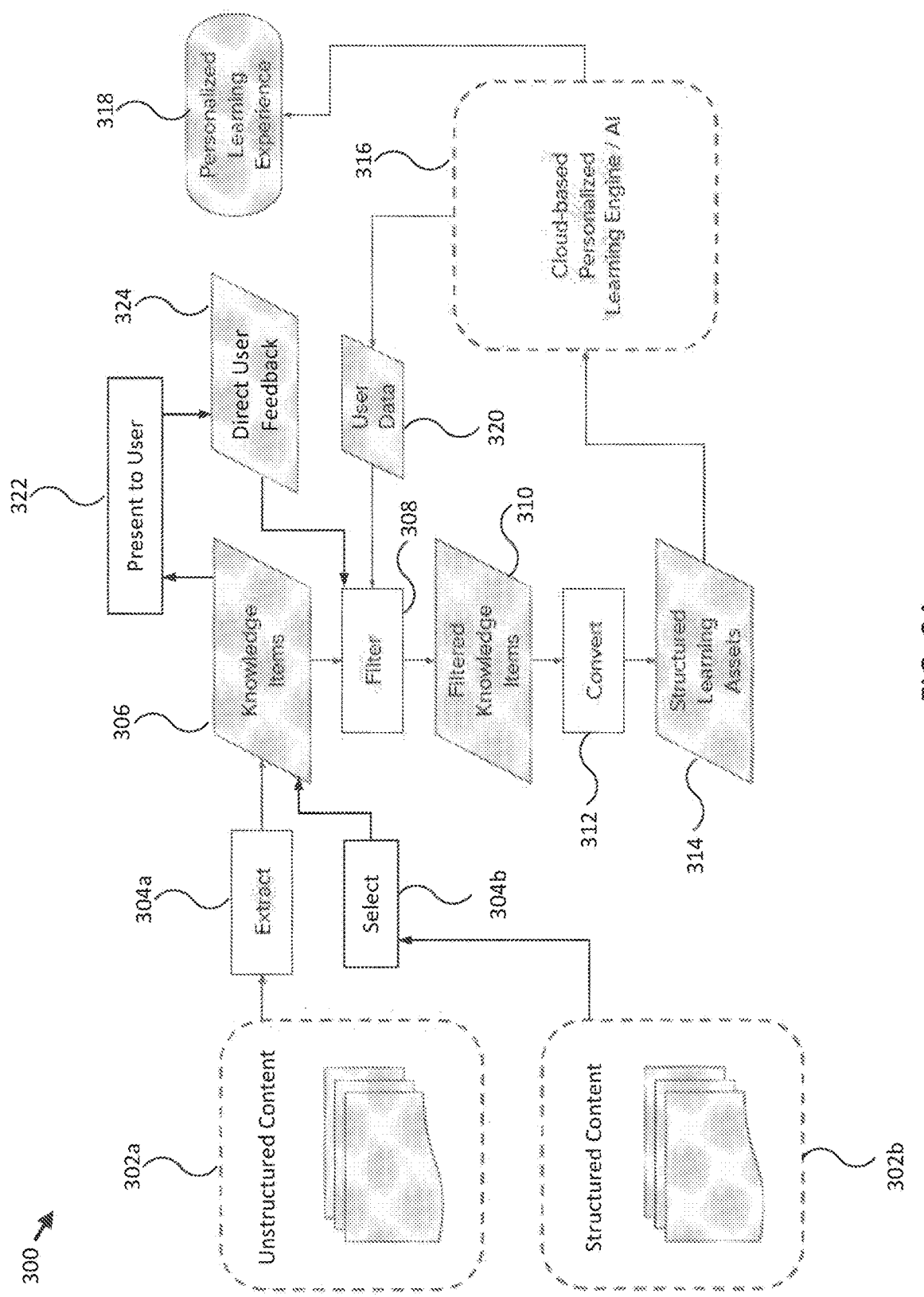
FIGS. 3A-3C are simplified diagrams of processes that may be performed by learning systems and/or in accordance with an embodiment of the disclosure.
Figure 3B:
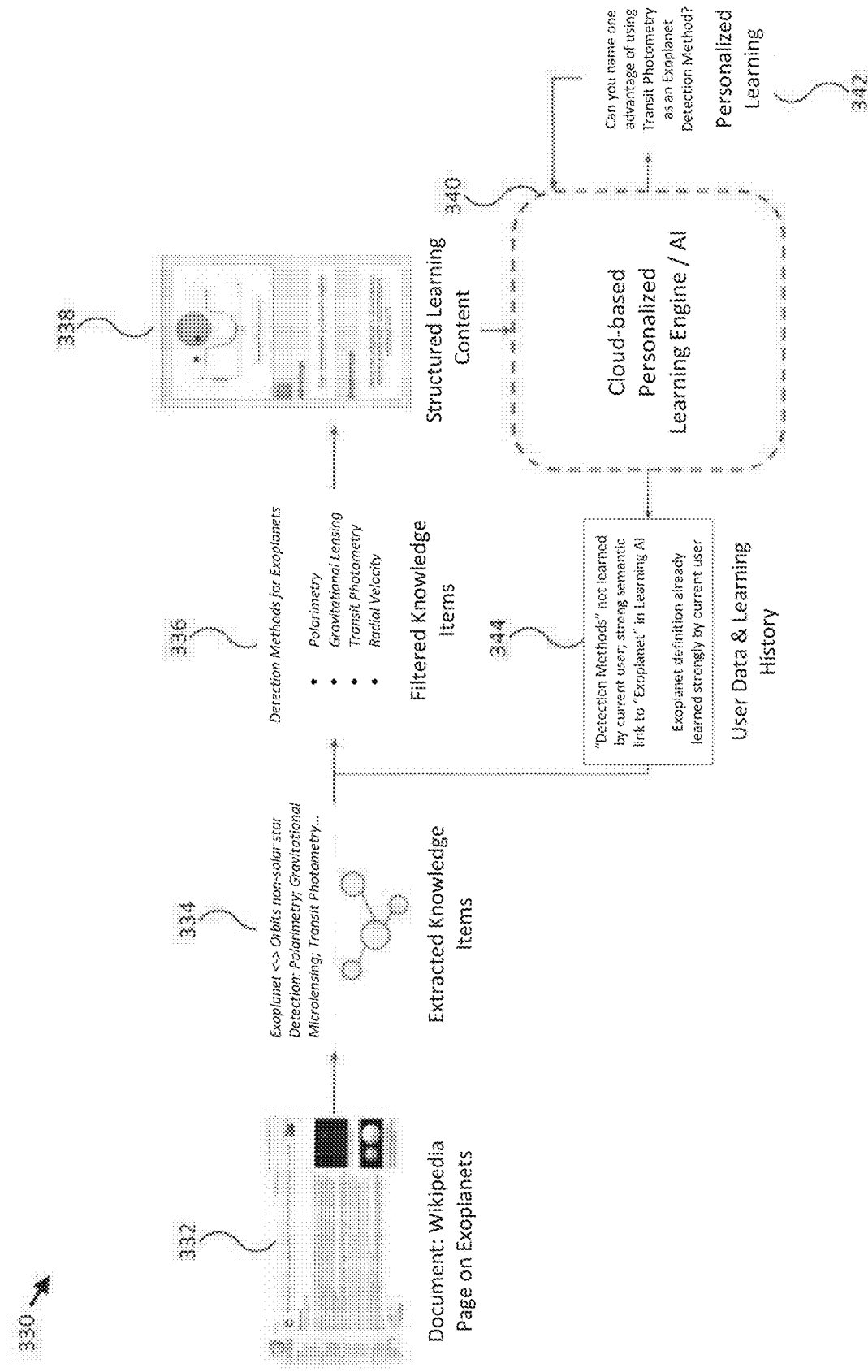
Figure 3C:
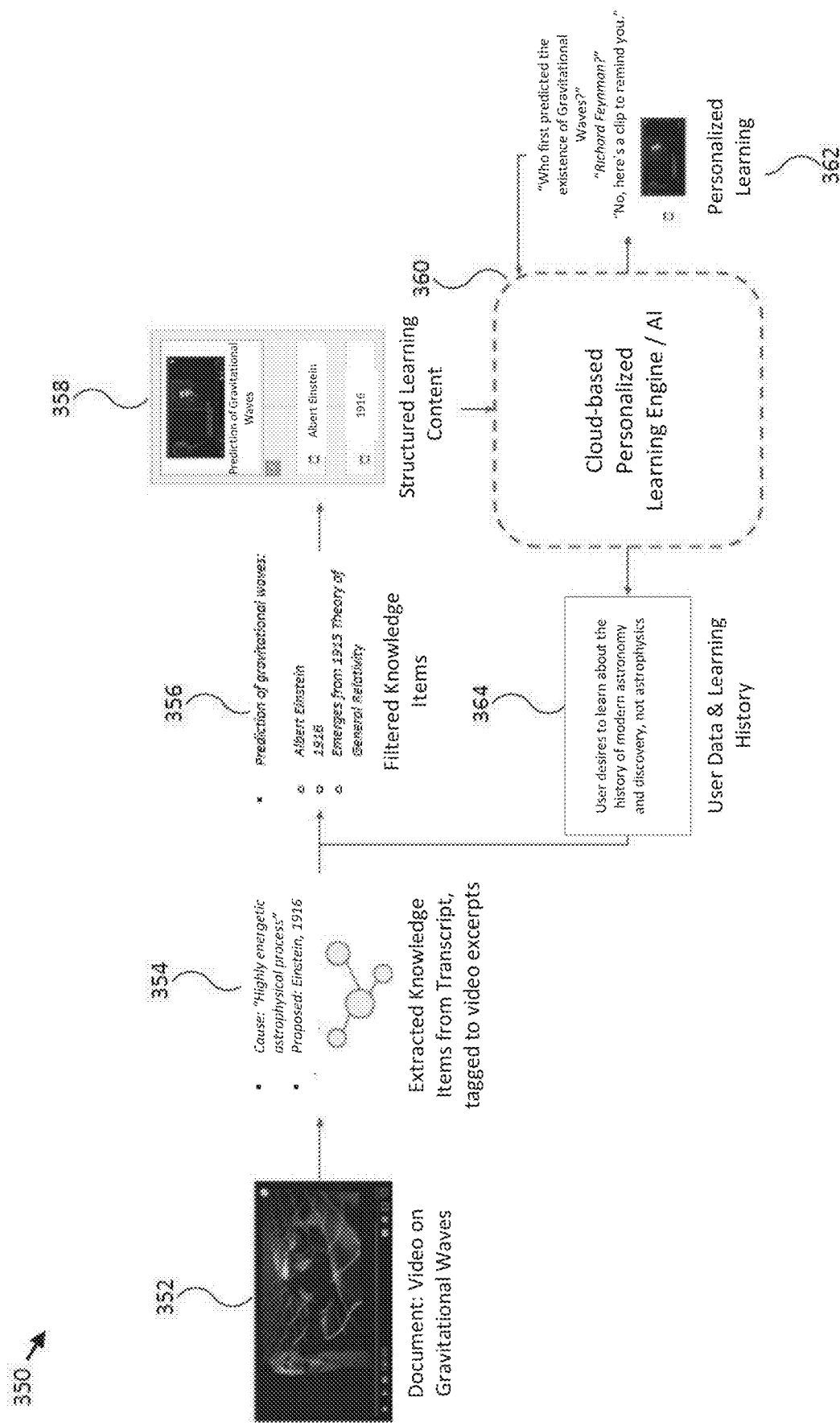

FIGS. 3A-3C illustrate processes 300, 330, and 350 that may be performed by learning systems 100 and/or 200 in accordance with an embodiment of the disclosure. Learning systems 100 and/or 200 may perform processes 300, 330, and 350 without user actions, particularly without learner and/or instructor actions.

Although various blocks of FIGS. 3A-3C are primarily described as being performed by one or more of learning systems 100 and/or 200, other embodiments are also contemplated wherein the various steps may be performed by any desired combination of learning systems and/or user devices, such as learner devices and/or instructor devices described herein.

At steps 302a and 302b, learning systems 100 and/or 200 may retrieve or obtain various types of digital source materials as described herein. In one example, the digital source material may include unstructured content, as depicted in step 302a. For example, the unstructured content may include an audio and/or video representation of a learning experience (e.g., a lecture, a tutorial, a demonstration, etc.), a textual and/or pictorial representation of learning material (e.g., a textbook, a webpage, an instruction manual, etc.), metadata, and/or the like. The unstructured content may be unimodal (e.g., pure text) and/or multimodal (e.g., combining text, audio, and/or images). In another example, the digital source material may include structured content, as depicted in step 302b. For example, the structured content may include database content, a knowledge graph, content that has been previously retrieved and processed by learning systems 100 and/or 200 (e.g., content that was retrieved as unstructured content and subsequently processed into a structured format), and/or the like. In further examples, the digital source material may include any suitable combination of structured and/or unstructured content. In some examples, the digital source materials may include a plurality of source materials retrieved one at a time and/or at the same time.

At steps 304a and 304b, learning systems 100 and/or 200 may extract and/or select a set of knowledge items from the digital source material. Each knowledge item generally corresponds to a discrete fact, figure, and/or illustration (and/or a group or related facts, figures, and/or illustrations) presented in the digital source material that the user may desire to learn. In some examples, the knowledge items may be extracted from unstructured content, as depicted in step 304a. In some examples, extracting the knowledge items may include performing image, character, and/or speech recognition of image, textual, and/or audio data included in the digital source material. Extracting the knowledge items may further include parsing, subsetting, sorting, classifying, clustering, and/or otherwise organizing the digital source material to support the identification of knowledge items. In some examples, the knowledge items may be selected from structured content, as depicted in step 304b. In some examples, selecting the knowledge items may include finding items in the structured content (e.g., traversing a knowledge graph, searching a database, etc.) that the user may desire to learn.

At step 306, learning systems 100 and/or 200 may process the set of knowledge items as further described herein. In one example, learning systems 100 and/or 200 may identify, tag, label, categorize, format, deduplicate, score, sort, index, and/or store the knowledge items. For example, learning systems 100 and/or 200 may organize the knowledge items by subject and/or by topic.

At step 308, learning systems 100 and/or 200 may filter the set of knowledge items based on user data and/or direct user feedback. Filtering based on direct user feedback may include asking the user to rate, select, add, remove, and/or edit the knowledge items. Filtering based on user data may include identifying one or more learning objectives of the user. In some examples, the learning objectives may correspond to a query provided manually by the user that identifies subject matter that the user desires to learn. In some examples, the learning objectives may be generated automatically based on, for example, the user's existing knowledge. For example, the learning objectives may be automatically selected such that the user is not asked to re-learn a knowledge item that the user has already strongly learned. Learning systems 100 and/or 200 may compare the user's level of knowledge to a predetermined threshold to determine whether re-learning a particular knowledge item is warranted. In some examples, the learning objectives may be generated based on a combination of manually provided and automatically generated user data.

According to some embodiments, learning systems 100 and/or 200 may filter the set of knowledge items by determining a relevance of a particular knowledge item to the learning objective. For example, learning systems 100 and/or 200 may calculate a relevance score for a particular knowledge item and determine whether the relevance score meets a minimum threshold. When the particular knowledge item does not meet the minimum threshold for relevance, that item is filtered out. The minimum threshold may correspond to an absolute threshold and/or a relative threshold. For example, filtering using an absolute threshold may include selecting knowledge items with a relevance score greater than a predetermined value (and/or filtering out knowledge items with a relevance score less than a predetermined value), whereas filtering using a relative threshold may include selecting the top N scores among the set of knowledge items (and/or filtering out the bottom N scores).

According to some embodiments, learning systems 100 and/or 200 may filter the set of knowledge items by determining a similarity of a particular knowledge item to other knowledge items. For example, learning systems 100 and/or 200 may determine whether the particular knowledge item is a duplicate and/or a near duplicate of another knowledge item. When the particular knowledge item is a duplicate and/or a near duplicate, that item is filtered out.

At step 310, learning systems 100 and/or 200 may process the set of filtered knowledge items, where the filtered knowledge items correspond to those that are not filtered out at process 308. In one example, learning systems 100 and/or 200 may identify, index, and/or store the set of filtered knowledge items.

At step 312, learning systems 100 and/or 200 may generate a set of structured learning assets based on the set of filtered knowledge items as described herein. In one example, learning systems 100 and/or 200 may convert the filtered knowledge items to structured learning assets or resources. In some examples, learning systems 100 and/or 200 may convert the filtered knowledge items by copying information associated with the filtered knowledge items into a template corresponding to the structured learning asset. For example, the template may include a diagram field and a caption field. Accordingly, learning systems 100 and/or 200 may insert a diagram from the filtered knowledge items into the diagram field and a corresponding caption for the diagram into the caption field. In another example, learning systems 100 and/or 200 may determine a relationship between filtered knowledge items, and/or a relationship between concepts within a given filtered knowledge item, to form a question and answer pair. For example, if the filtered knowledge item corresponds to "Albert Einstein was born in Germany," the structured learning asset may correspond to "Question: Where was Albert Einstein born?" and "Answer: Germany."

At step 314, learning systems 100 and/or 200 may process the set of structured learning assets. In one example, learning systems 100 and/or 200 may identify, index, and/or store the set of structured learning assets or resources. In another example, learning systems 100 and/or 200 may process the structured learning assets without user interactions (e.g., user highlights) as described herein.

At step 316, learning systems 100 and/or 200 may generate one or more interactions based on the structured learning assets. In one example, a cloud-based personalized learning engine and/or artificial intelligence engine, such as adaptive engines 106 and/or 226, may generate the one or more interactions. In some examples, the one or more interactions may be generated based on a user's history with similar structured learning assets. For example, learning systems 100 and/or 200 may access user feedback from step 308 and/or user data from step 320 (as described below) associated with a previously processed structured learning asset to generate the one or more interactions.

At step 318, learning systems 100 and/or 200 may generate a personalized learning experience based on the one or more interactions. In one example, learning systems 100 and/or 200 may generate the personalized learning experiences with interaction applications 109 described herein.

At step 320, learning systems 100 and/or 200 may generate user data that may be used at step 308 described herein to filter the set of knowledge items. In some examples, the user data may include one or more metrics that indicate the user's level of retention and/or understanding of the digital source material corresponding to the knowledge items. In some examples, the one or more metrics may be determined based on the learner responses to the one or more interactions of the personalized learning experience. For example, the one or more metrics may be determined based on whether responses 234, 236, and/or 238 are correct or incorrect. In some examples, the one or more metrics may further be determined based on historical user responses associated with similar knowledge items and/or interactions that reflect the user's understanding of the current knowledge items.

In some embodiments, the user data may include direct user feedback. Consistent with such embodiments, at step 322, learning systems 100 and/or 200 may present the set of knowledge items extracted from the digital source material at step 306 to the user via a user interface. By presenting the knowledge items to the user, the user has the opportunity to provide direct feedback to learning systems 100 and/or 200 regarding the relevance of each of the knowledge items to the user's learning objectives.

At step 324, learning systems 100 and/or 200 may receive direct user feedback via the user interface that may be used at step 308 described herein to filter the set of knowledge items. The direct user feedback may include ratings, selections, additions, removals, edits, and/or any other type of user input that indicates the relevance of the knowledge items to the user's learning objectives.

Referring now to FIG. 3B, steps 332-344 of process 330 may relate to steps 302-324 of process 300. In one example, one or more of steps 302-324 may be sub-steps to process 330 and one or more steps 332-344 may be sub-steps to process 300.

At step 332, learning systems 100 and/or 200 may retrieve or obtain various types of digital source materials as described herein. In the example depicted in FIG. 3B, the digital source material includes a webpage on exoplanets.

At step 334, learning systems 100 and/or 200 may extract a set of knowledge items from the digital source materials as described herein. Continuing the example depicted in FIG. 3B, in which the digital source material includes a webpage on exoplanets, the knowledge items may include facts, figures, images, and/or multimedia clips related to exoplanets, as well as associated topics and/or sub-topics such as orbits, non-solar stars, detections, polarimetry, gravitational microlensing, and/or transit photometry, among other possibilities.

At step 336, learning systems 100 and/or 200 may filter the set of knowledge items based on user data as described herein. For example, when the user data indicates that the user has not yet learned about detection methods for exoplanets, the set of filtered knowledge items may include a knowledge item that lists detection methods for exoplanets. Notably, learning systems 100 and/or 200 may filter out a knowledge item that defines the term "exoplanet" when the user data indicates that the user already knows what an exoplanet is.

At step 338, learning systems 100 and/or 200 may generate a set of structured learning assets that correspond to the set of filtered knowledge items. In one example, learning systems 100 and/or 200 may generate the structured learning assets based on templates as further described herein. For example, learning systems 100 and/or 200 may generate a structured learning asset based on a "detection method" template that includes the following fields: a diagram of the detection method, advantages of the detection method, and disadvantage of the detection method. The fields of the "detection method" template may be populated using data from the filtered knowledge items, such as a diagram of transit photometry, an advantage of transit photometry, and a disadvantage of transit photometry.

At step 340, learning systems 100 and/or 200 may generate one or more interactions based on the structured learning assets. In one example, a cloud-based personalized learning engine and/or artificial intelligence engine, such as adaptive engines 106 and/or 226, may generate the one or more interactions. For example, learning systems 100 and/or 200 may generate an interaction that includes a question. "Can you name one advantage of using Transit Photometry as an Exoplanet Detection Method?" The question may be a multiple choice question, a matching question, and/or a fill-in-the blank question, among other possible questions, formats, and/or modalities.

At step 342, learning systems 100 and/or 200 may generate a personalized learning experience based on the one or more interactions described herein. In one example, learning systems 100 and/or 200 may generate the personalized learning experiences with interaction applications 109 described herein.

At step 344, learning systems 100 and/or 200 may generate user data that may be used at step 336 described herein to filter the set of knowledge items. In one example, the user data may include or indicate the learner history and/or learner responses to the one or more interactions of the personalized learning experience. For example, the user data may indicate, "'Detection Methods' is not learned by current user; strong semantic link to 'Exoplanet' in Learning AI" and/or "Exoplanet definition already learned strongly by current user." As described above, based on the user data, 'Detection Methods' may be included in the set of filtered knowledge items because it is not yet learned by the user, but 'Exoplanet definition' may be filtered out because it is already learned strongly.

Referring now to FIG. 3C, steps 352-364 of process 350 may relate to steps 302-324 and/or 332-344 of processes 300 and/or 330. In one example, one or more of steps 302-324 and/or 332-344 may be sub-steps to process 350 and one or more steps 352-364 may be sub-steps to processes 300 and/or 350.

At step 352, learning systems 100 and/or 200 may receive or obtain various types of digital source materials as described herein. In the example depicted in FIG. 3B, the digital source material includes a video on gravitational waves.

At step 354, learning systems 100 and/or 200 may extract a set of knowledge items from the digital source materials described herein. Continuing the example depicted in FIG. 3B, in which the digital source material includes a video on gravitational waves, the knowledge items may be extracted from audio and/or image analysis of the video from video metadata, from a transcript of the video, and/or from tagged words from video excerpts. The knowledge items may include facts, figures, images, and/or multimedia clips related to gravitational waves, as well as associated topics and/or sub-topics such as the cause of gravitational waves, highly energetic astrophysical processes, historical figures such as Einstein, and the year when the waves were proposed, among other possibilities.

At step 356, learning systems 100 and/or 200 may filter the set of knowledge items based on user data as described herein. For example, when the user data indicates that the user is interested more in the history of astrophysics than the science of astrophysics, the set of filtered knowledge items may include items associated with the prediction of gravitational waves. As such, the filtered knowledge items may include "Albert Einstein" (i.e., the scientist who predicted gravitational waves), "1916" (i.e., the year gravitational waves were predicted), and/or "emerges from 1915 theory of general relativity" (i.e., the historical context for the prediction of gravitational waves). Notably, learning systems 100 and/or 200 may filter out knowledge items that are not specifically associated with the history of gravitational waves, such the cause of the gravitational waves and the detection of gravitational waves, among other possible items.

At step 358, learning systems 100 and/or 200 may generate a set of structured learning assets that correspond to the set of filtered knowledge items. In one example, learning systems 100 and/or 200 may generate the structured learning assets based on templates as further described herein. For example, learning systems 100 and/or 200 may generate a structured learning asset based on a "historical discovery" template that includes the following fields: a link to the digital source material, the name of the person who made the discovery, and the year of the discovery. The fields of the "detection method" template may be populated using data from the filtered knowledge items, such as video clip describing the prediction of Gravitational Waves, the name Albert Einstein, and the year 1916.

At step 360, learning systems 100 and/or 200 may generate one or more interactions based on the structured learning assets. In one example, a cloud-based personalized learning engine and/or artificial intelligence engine, such as adaptive engines 106 and/or 226, may generate the one or more interactions. For example, learning systems 100 and/or 200 may generate an interaction that includes a question. "Who first predicted the existence of Gravitational Waves?" The question may be a multiple choice question, a matching question, and/or a fill-in-the blank question, among other possible questions, formats, and/or modalities.

At step 362, learning systems 100 and/or 200 may generate a personalized learning experience based on the one or more interactions described herein. In one example, learning systems 100 and/or 200 may generate the personalized learning experiences with interaction applications 109 described herein. Consider the example above where learning systems 100 and/or 200 generate an interaction that includes a question. "Who first predicted the existence of Gravitational Waves?" In such instances, a learner response may be, "Richard Feynman." Learning systems 100 and/or 200 may generate and transmit another interaction that includes, "No, here's a clip to remind you," including a clip from the structured learning asset with the video of the prediction of Gravitational Waves.

At step 364, learning systems 100 and/or 200 may generate user data that may be used at step 356 described herein to filter the set of knowledge items. In one example, the user data may include or indicate the learner history and/or learner responses to the one or more interactions of the personalized learning experience.

In some instances, the user data may indicate one or more learning objectives, such as the desire to learn about one or more topics and/or not learn about one or more other topics. For example, the user data may indicate. "User desires to learn about the history of modern astronomy and discovery, not astrophysics."

Figure 4A:
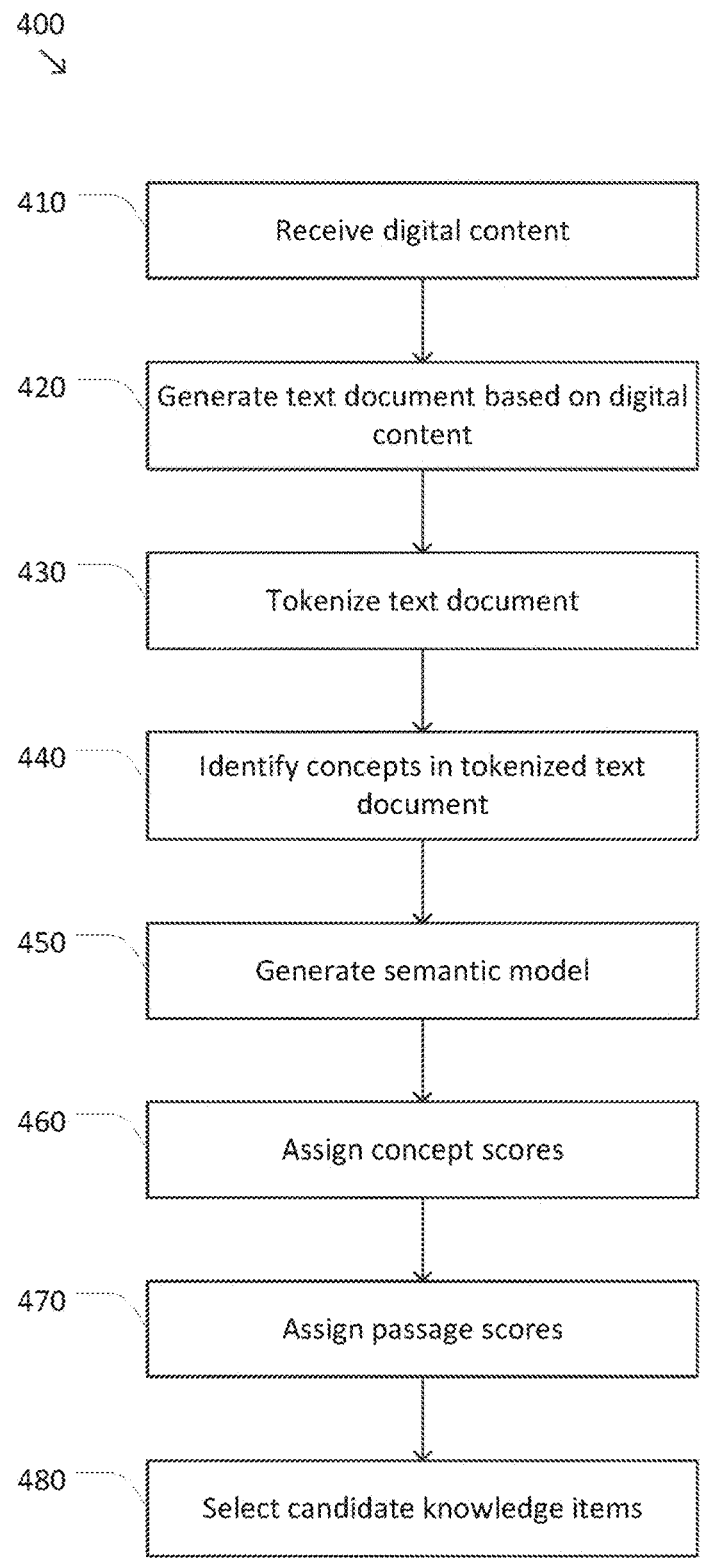
FIGS. 4A-4B are simplified diagrams of a method for extracting knowledge items from digital content according to some embodiments.
Figure 4B:
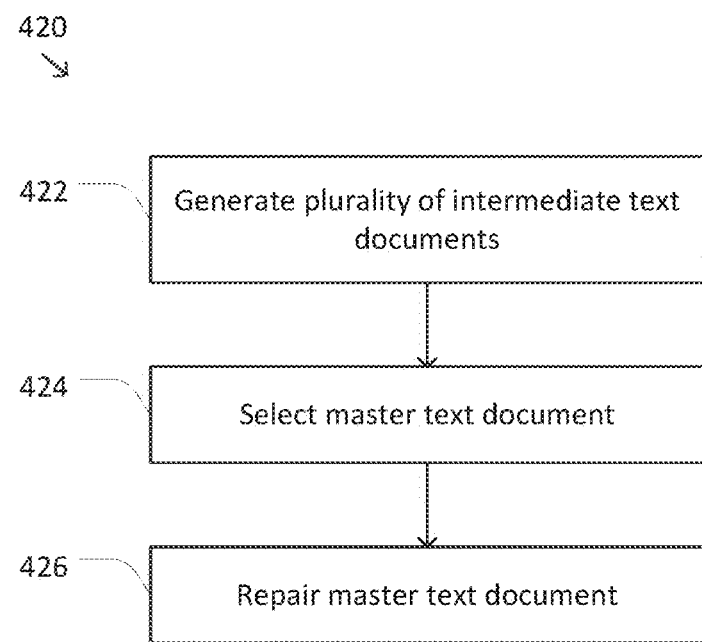

FIGS. 4A-4B are simplified diagrams of a method 400 for extracting knowledge items from digital content according to some embodiments. In some examples consistent with FIGS. 1-3C, method 400 may be used to implement steps 304a. 334, and/or 354 of processes 300, 330, and/or 350, respectively. Consistent with such embodiments, method 400 may be performed by learning systems 100 and/or 200.

At a process 410, digital content is received. In some examples, the digital content may include one or more digital files associated with digital source materials, such as online textbooks, instruction videos, journal articles, and/or the like. In various embodiments, the digital content may be unstructured and/or heterogeneous. For example, the digital content may include raw text. HTML files. PDF files, multimedia content (e.g., JPEG, MPG, PNG, etc.), compressed files, and/or the like. In some examples, the digital content may be received over the Internet and/or retrieved from local storage.

At a process 420, a text document is generated based on the digital content. In some examples, generating the text document may include extracting raw text, metadata, and/or other features of the digital content that are representable in a text-based format. In general, the techniques used to generate the text document may vary based on the type and/or characteristics of the digital content. For example, when the digital content includes images of text (e.g., when the digital content includes a PDF file and/or scanned text), the text document may be generated by performing optical character recognition (OCR) on the digital content to convert the images to text. In another example, when the digital content includes text in a markup language (e.g., when the digital content includes an HTML and/or XML file), the text document may be generated by parsing and/or "scraping" the digital content to extract relevant text. In some examples, when the digital content includes multimedia content, generating the text document may include identifying metadata associated with the multimedia content. For example, the metadata may be extracted from the multimedia file itself (e.g., an author, title, and/or description of the multimedia work embedded in the multimedia file) and/or retrieved from an external resource (e.g., by looking up song lyrics from an online database). In some embodiments, the text document may be generated using machine learning techniques. For example, an image recognition machine learning model may be used to label objects appearing in an image or video, a speech recognition machine learning model may be used to transcribe spoken-word audio, an artificial intelligence model may be used to automatically summarize the digital content in plain language, and/or the like.

Although numerous embodiments of process 420 are contemplated, FIG. 4B depicts a particular embodiment of process 420 that may be used to improve the quality and/or accuracy of the generated text document in certain circumstances. In some examples, the embodiment of process 420 depicted in FIG. 4B may be particularly suited for converting images and/or speech to text (e.g., when the digital content includes PDF files and/or audio files).

Various techniques exist for converting images and/or speech to text, and in general, each technique has different strengths and weaknesses that may affect the quality of the resulting text document. While a particular technique may provide the most accurate results some cases, another technique may be more accurate in other cases. Accordingly, the embodiment of process 420 depicted in FIG. 4B may be used to harness the strengths of various conversion techniques when generating a text document from digital content.

At a process 422, a plurality of intermediate text documents are generated from the digital content using a corresponding plurality of conversion techniques. For example, when the digital content includes a PDF file, process 422 may include using a plurality of PDF-to-text converters to generate the corresponding plurality of intermediate text documents. Similarly, when the digital content includes an audio file, process 422 may include using a plurality of speech-to-text converters. Each of the plurality of intermediate text documents may include various defects (e.g., OCR errors, speech detection errors, etc.) and/or may otherwise vary in quality based on the relative strengths and/or weaknesses of the corresponding conversion technique.

At a process 424, a master text document is selected from the plurality of intermediate text documents. In some examples, the master text document may correspond to the highest quality text document among the plurality of intermediate text documents. In some examples, the master text document may be selected manually and/or automatically, using objective and/or subjective criteria.

Although the master text document may be the highest quality document among the plurality of intermediate text documents, the master document may still have one or more defects. Accordingly, at a process 426, the master text document is repaired. In some examples, repairing the master text document may include automatically and/or manually identifying and correcting defects in the master text document. For example, defects in the master text document may be patched using corresponding, non-defective portions of one or more of the other intermediate text documents. When the master text document has been repaired, method 400 may proceed to a process 430 for further processing of the text document.

Returning to FIG. 4A, at a process 430, the text document is tokenized. That is, the text document is split into tokens (e.g., paragraphs, sentences, clauses, phrases, words, and/or the like). In some examples, the text document may be tokenized based on white space (e.g., spaces, tabs, return carriages, and/or the like), punctuation (e.g., periods, question marks, exclamation points, and/or the like), grammatical features (e.g., transition words in a compound sentence), and/or the like. In some embodiments, natural language processing techniques may be used to accurately identify tokens. For example, natural language processing techniques may be used to distinguish a period marking the end of a sentence from other uses of the period character, such as a decimal point and/or an abbreviation. In some embodiments, process 430 may further include determining supplemental information corresponding to the tokens. For example, process 430 may include performing lemmatization to identify a lemma associated with a word token, indexing to identify a dictionary index associated with a word token, and/or the like. Consistent with such embodiments, the tokenized text document generated at process 430 may include one or more data structures that collectively provide access to the raw text of the text document, the tokens appearing in the text document, and/or the supplemental information associated with the tokens.

At a process 440, concepts in the tokenized text document are identified. In some embodiments, the concepts may correspond to noun phrases (i.e., a group of one or more words describing a particular person, place, or thing). Consistent with such embodiments, the concepts may be identified by performing part of speech (POS) tagging and noun chunking based on the tokenized text document. Part of speech tagging includes identifying the part of speech (e.g., noun, verb, adjective, etc.) of each word in the text document. Chunking includes identifying groups of words that form noun phrases based on patterns in the tokenized and tagged text document. In some examples, part of speech tagging and/or noun chunking may be performed using machine learning and/or natural language processing techniques. In some embodiments, process 440 may further include identifying relationships among the concepts. For example, process 440 may include building a syntactic graph associated with the tokenized text document, in which the identified concepts form nodes and the identified relationships among concepts form vertices. More broadly, process 440 may include identifying and/or describing structural and/or syntactic features of the tokenized text document in preparation for modeling and/or understanding its content.

At a process 450, a semantic model of the digital content is generated. The semantic model identifies one or more topics and/or sub-topics covered by the digital content. In some examples, the semantic model may be identified by performing semantic analysis based on the concepts in the tokenized text document. In some examples, the semantic model may be generated using an unsupervised machine learning algorithm. Examples of unsupervised machine learning algorithms include explicit semantic analysis (ESA), latent semantic analysis (LSA), and/or the like. In some examples, the unsupervised machine learning algorithm may perform clustering based on the distribution of words in the tokenized text document. Examples of clustering techniques include hierarchical cluster analysis, k-means clustering, Gaussian mixture model, and/or the like. For example, the unsupervised machine learning algorithm may include modeling the distribution of words in the tokenized text document as a mixture of categorical distributions, where each categorical distribution corresponds to a topic, and applying a Gaussian mixture model to the categorical distributions identify one or more topics in the tokenized text document. In this manner, a semantic model of the digital content is formed, where the semantic model may include an outline of the topics and/or sub-topics covered by the digital content, locations within the digital content that embody the topics and/or sub-topics, and/or the like.

At a process 460, concept scores are assigned to the concepts identified at process 440. The concept scores indicate how relevant and/or important each concept is to the ideas presented in the digital content and/or to the user's learning objectives. In some examples, the concept score may include a numerical score, a ranking of concepts, a classification of concepts (e.g., "high." "medium." and "low" relevance), a selection of the n most relevant concepts, and/or the like. In some examples, a given concept score may be assigned based on a relationship between a concept and the semantic model generated at process 450. For example, the relationship may be defined by a centrality metric that indicates how central the concept is to the topics and/or sub-topics in the semantic model. By using the centrality metric to determine the concept score, a concept that is closely related to one or more topics and/or sub-topics in the semantic model may receive a higher concept score than a concept that is distinct from the topics and/or sub-topics in the semantic model. Additionally or alternately, a given concept score may be assigned based on the specificity of the concept. Accordingly, a concept that is expressed using generic terms (e.g., "person") may receive a lower concept score than a concept expressed using terms with narrower meanings (e.g., "doctor" or "professor"). In further examples, a concept score may be assigned based on a relationship between a concept and a user's learning objectives. For example, if a user indicates that they desire to learn about a particular topic (e.g., "astronomy"), a concept closely related to this topic may receive a higher concept score than an unrelated and/or tangentially related concept.

At a process 470, a passage score is assigned to each passage of the tokenized text document. For example, a passage may correspond to a phrase, sentence, paragraph, and/or the like. In general, a passage score indicates whether the passage is likely to include substantive information (e.g., facts, figures, etc.) that pertains to one or more topics covered by the digital content. In some examples, a passage score may include a numerical score, a ranking of passages, a classification of passages (e.g., "high," "medium," and "low" likelihood of containing relevant information), a selection of the top n passages, and/or the like.

In some embodiments, each passage score may be determined based on a relationship between the corresponding passage and the semantic model. For example, the passage score may be determined based on concept scores assigned to one or more concepts that appear in the passage, where each concept score is assigned based on a relationship between a concept and the semantic model as discussed previously with reference to process 460. In some examples, the passage score may be determined by aggregating the concept scores of each concept in the passage (e.g., by computing the sum, average, weighted average, and/or the like of each concept appearing the passage). In some examples, various other parameters associated with the passage, such as the length of the passage, the number of concepts in the passage, grammatical features of the passage, and/or the like may factor into the passage score. In some examples, a formula and/or algorithm used to generate the passage score based on the various parameters may be updated over time based on user feedback (e.g., user feedback collected at step 324 of process 300). Such updates may occur manually and/or automatically (e.g., using a machine learning algorithm).

At a process 480, candidate knowledge items are selected from among the passages of the tokenized text document based on the passage scores. For example, selecting the candidate knowledge items may include iterating through the passages in the tokenized text document to determine whether a particular passage qualifies as a candidate knowledge item. Consistent with such embodiments, a passage may be selected as a candidate knowledge item when the corresponding passage score is above a threshold value, when the passage score is among the top n passage scores overall, when the passage score is among the top n passage scores for a particular topic and/or sub-topic, and/or the like. In some embodiments, the threshold value may vary based on the topic and/or sub-topic.

In some embodiments, the candidate knowledge items may be selected adaptively. That is, the selection may account for similarities between a current passage and other passages that were previously selected as candidate knowledge items. Adaptive selection may reduce and/or eliminate redundancies among the candidate knowledge items caused by selecting multiple passages that provide the same or similar information. In some examples, adaptive selection may include reducing a passage score when a passage includes concepts that have already been covered in another passage that was selected as a candidate knowledge item. For example, adaptive selection may include incrementally reducing a concept score each time the corresponding concept appears in a passage. In this manner, whenever the concept appears in a passage, subsequent passages repeating the same concept are less likely to be selected as candidate knowledge items. Similarly, adaptive selection may include incrementally reducing the concept scores assigned to a group of concepts pertaining to the same topic and/or sub-topic each time one of the group of concepts appears in a passage.

According to some embodiments consistent with FIGS. 1-3C, upon selecting the candidate knowledge items at process 470, method 400 may proceed to steps 306 and/or 356 of process 300. In this regard, the candidate knowledge items selected at process 470 may be presented to a user and/or filtered based on user data, as discussed previously.

Figure 5:
FIG. 5 is a simplified diagram of templates for structured learning assets and user devices in accordance with an embodiment of the disclosure.
Figure 5:
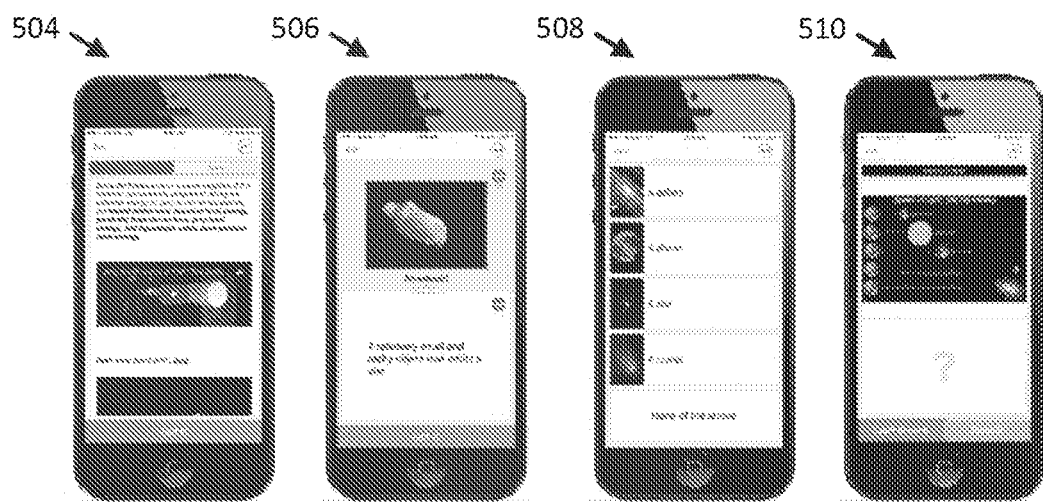

FIG. 5 illustrates templates 500 for structured learning assets 512 and user devices 504, 506, 508, and/or 510 in accordance with an embodiment of the disclosure. In one example, one or more user devices 504, 506, 508, and/or 510 may take the form of user devices 204, 206, and/or 208.

In one embodiment, structured learning assets 512 may be generated based templates 500. In one example, templates 500 may include association templates, vocabulary templates, passage templates, image and/or video region templates, sequence templates, and/or pattern templates, among other possible templates.

In one embodiment, one or more interactions may be generated based on structured learning assets 512. The one or more interactions may be transmitted to one or more user devices 504, 506, 508, and/or 510. In one example, user devices 504, 506, 508, and/or 510 may display and/or otherwise output the interactions based on the respective hardware interfaces user devices 504, 506.508, and/or 510, such audio speakers.

Figure 6A:
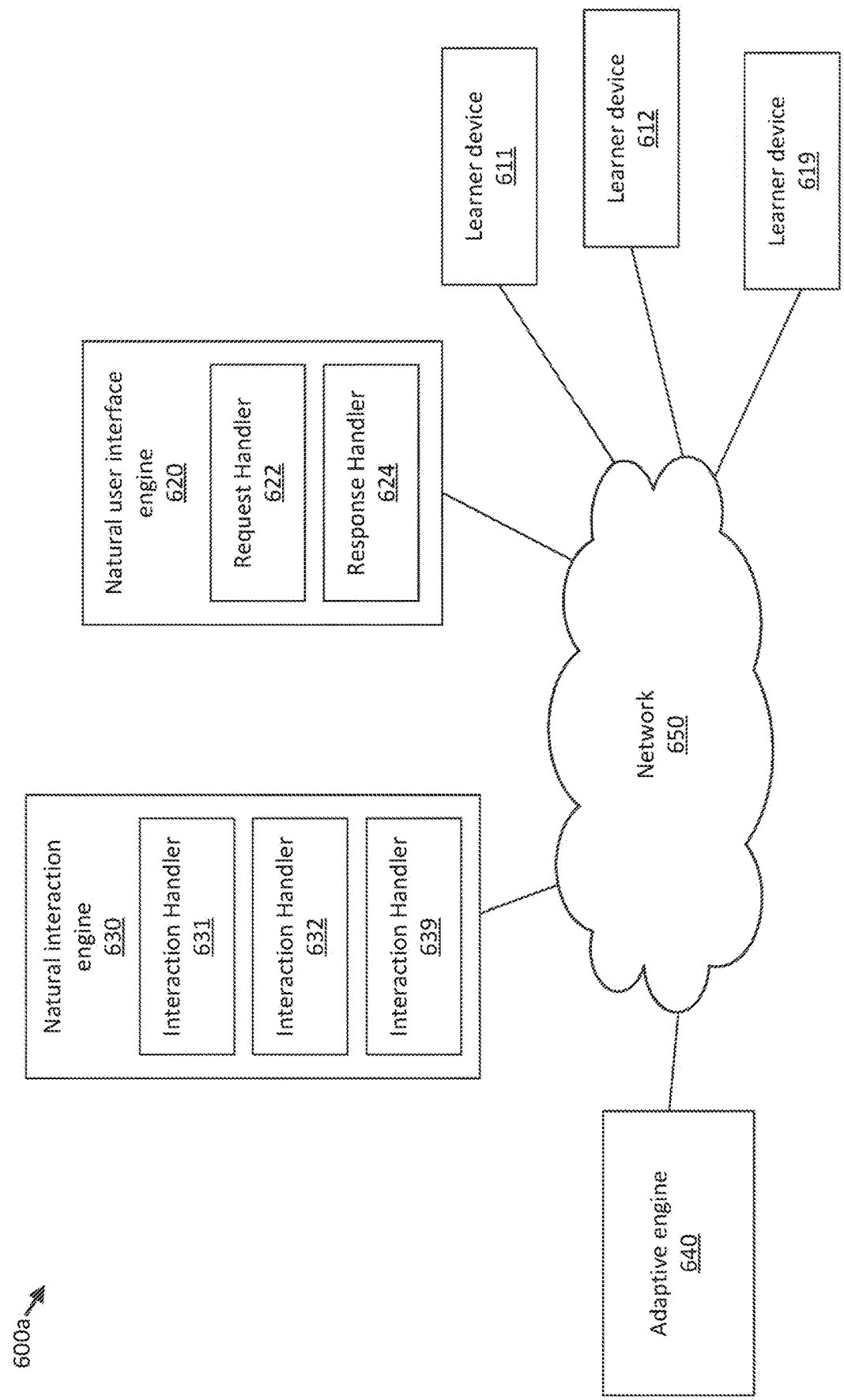
FIG. 6A is a simplified diagram of a learning system with a natural user interface in a cloud-based configuration in accordance with an embodiment of the disclosure.

FIG. 6A illustrates a learning system 600a with a natural user interface in a cloud-based configuration in accordance with an embodiment of the disclosure. Learning system 600a allows a user, such as a learner and/or an instructor, to interact naturally (e.g., conversationally) with learning system 600a. For example, learning system 600a may provide the user with one or more of a voice interface, a gesture interface, a chat interface, a drawing interface, and/or the like. Accordingly, the user may engage with learning system 600a using conversational speech, body movements (e.g., pointing, facial expressions), sketches, and/or the like. These modes of engagement may enhance the user's learning/ teaching experience by offering an intuitive way to interact with learning system 600a.

Learning system 600a includes one or more learner devices 611-619, a natural user interface engine 620, a natural interaction engine 630, and an adaptive engine 640. In some examples, one or more components of learning system 600 may be communicatively coupled via a network 650, such as an Internet network and/or a local area network.

Learner devices 611-619 each include one or more input/ output modules to interact with the user of learning system 600. Learner devices 611-619 may include virtually any device that supports natural user interactions and is capable of communication over network 650. For example, learner devices 611-619 may include an audio input module such as a microphone, a physical input module such as a camera, a touch screen, and/or a drawing pad, a symbolic input module such as a keyboard, and/or the like. Likewise, learner devices 611-619 may include an audio output module such as a speaker, a physical output module such as an actuator and/or a haptic device, a visual output module such as a graphical display, and/or the like. The input/output module(s) may be connected to and/or incorporated into a device capable of communication over network 650, such as a watch, phone, tablet, laptop computer, desktop computer, television, gaming console, speaker system, car, virtual/augmented reality headset, Internet of Things (IoT) object, and/or the like.

Learner devices 611-619 send and receive natural interactions to and from natural user interface engine 620 via network 650. A natural interaction may include a series of one or more user requests and a corresponding series of one or more responses generated by learning system 600a.

Natural user interface engine 620 receives and processes one or more user requests from learner devices 611-619 and determines a user intent associated with the user request. For example, the user intent may include a request for learning system 600a to perform a specified action, a query for information, an answer to a question prompt, and/or the like. In some embodiments, natural user interface engine 620 may include a request handler 622 to determine the user intent. Request handler 622 may interpret the user's request using one or more modules. For example, when the user makes a request using conversational speech, request handler 622 may process the user request using a speech-to-text conversion module and/or a natural language processing module. These modules may run locally as part of natural user interface engine 620, and/or may be accessed over network 650 (e.g., using a cloud-based application programming interface (API)).

Natural user interface engine 620 may trigger one or more system events based on the user intent. For example, the system event may include converting the user request into a structured representation of the user intent, such as a JSON and/or XML message. In some examples, the system event may include sending one or more notification messages that identify the user's intent to natural interaction engine 630 via network 650. In some examples, the one or more notification messages may include the structured representation of the user intent.

Natural user interface engine 620 also receives and processes response information from natural interaction engine 630 and synthesizes a corresponding response. For example, the response information may include response dialog, multimedia content, a confirmation that an action requested by the user has been performed, a prompt for user input, and/or the like. The synthesized response may include a natural response (e.g., conversational speech), a preformed response (e.g., a multimedia object and/or a scripted message), and/or a combination thereof. In some embodiments, natural user interface engine 620 may include a response handler 624 to synthesize the response based on received response information. Like request handler 622, response handler 624 may include one or more modules. For example, response handler 624 may include a text-to-speech module that generates a voice output based on a text input.

The synthesized response may be output using the same mode of engagement (e.g., speech, gesture, drawing, and/or text message) and/or on the same learning device as a received user request. Alternately, or additionally, the synthesized response may be output using a different mode of engagement and/or on a different learning device than the received user request. For example, the user request may include a voice interaction received via a microphone of learning device 611, and the synthesized response may include (a) a voice interaction output via a speaker of learning device 611 and/or (b) multimedia content played via a graphical display of learning device 612.

Natural interaction engine 630 coordinates one or more natural interactions between the user and learning system 600a. In some embodiments, natural interaction engine 630 may include one or more natural interaction handlers 631-639 that each correspond to a preconfigured natural interaction. In some examples, one or more of natural interaction handlers 631-639 may be invoked based on the particular user intent determined by natural user interface engine 620. For example, each of natural interaction handlers 631-639 may generate response information that is responsive to a different type of user request.

In some examples, natural interaction engine 630 may send and/or receive information from adaptive engine 640 via network 650. Adaptive engine 640 generally corresponds to adaptive engines 106 and/or 226, as discussed previously with respect to FIGS. 1-5. Consistent with such embodiments, adaptive engine 610 may retrieve knowledge items, such as knowledge items 116, knowledge items 220-224, and/or structured learning assets 512, from a knowledge item bank, such as knowledge item bank 104. In some examples, adaptive engine 610 may generate or obtain interactions, such as interactions 118 and/or 230, based on the retrieved knowledge items. Accordingly, to generate response information in response to a user request, natural interaction engine 630 may communicate with adaptive engine 640 to retrieve one or more knowledge items and/or interactions from adaptive engine 640.

By way of example, learning system 600a may be implemented using a cloud-based virtual assistant with voice interaction capabilities. In this example, at least one of learner devices 611-619 may be implemented using an Internet-enabled speaker connected via network 650 to natural user interface engine 620, which implements the cloud-based virtual assistant. A learner makes a user request through the Internet-enabled speaker by speaking conversationally. The Internet-enabled speaker sends a digital representation of the user request to the cloud-based virtual assistant over network 650. The cloud-based virtual assistant performs speech-to-text conversion and natural language processing on the user request to determine the user intent. The cloud-based virtual assistant determines whether the user intent matches one of natural interaction handlers 631-639 provided by natural interaction processor 630. When there is a match, the cloud-based virtual assistant sends a message to natural interaction processor 630 with information associated with the user intent. The matching natural interaction handler generates a response dialog to the user request and sends a response dialog to the cloud-based virtual assistant. The cloud-based virtual assistant converts the response dialog to a voice response and sends a digital representation of the voice response to the Internet-enabled speaker, which plays the voice response to the learner. In some examples, the response dialog may further include a multimedia component that instructs the cloud-based virtual assistant to render multimedia content to the learner via a second one of learner devices 611-619 that has a graphical display.

Figure 6B:
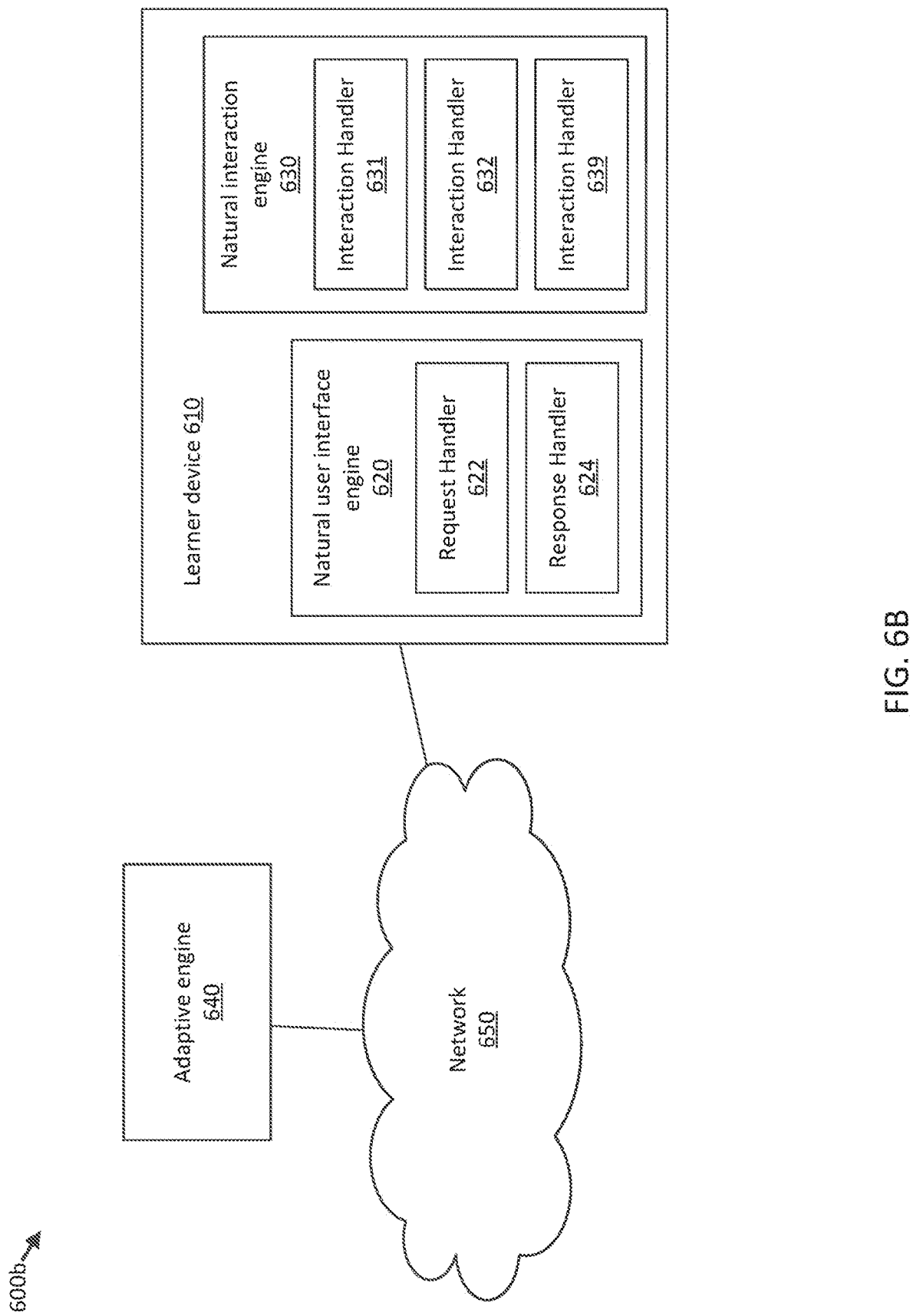
FIG. 6B is a simplified diagram of a learning system with a natural user interface in a device-based configuration in accordance with an embodiment of the disclosure.

FIG. 6B illustrates a learning system 600b with a natural user interface in a device-based configuration in accordance with an embodiment of the disclosure. Like learning system 600a, learning system 600b generally includes the same components as learning system 600a for providing natural interactions with a user. However, unlike the cloud-based configuration depicted in FIG. 6A, learning system 600b is arranged in a device-based configuration with natural user interface engine 620 and natural interaction engine 630 being implemented locally on a learner device 610. For example, natural user interface engine 620 and/or natural interaction engine 630 may be implemented using one or more dedicated hardware processors (e.g., dedicated chips) of learner device 610. In some example, learner device 610 may be a modular device, in which case the one or more dedicated hardware processors may be attachable/removable from learner device 610. In another example, natural user interface engine 620 and/or natural interaction 630 may be implemented using software instructions stored in a memory of learner device 610 and executed on one or more processors of learner device 610. In some examples, natural user interface engine 620 and/or natural interaction engine 630 may be run as virtual machines on learner device 610.

Although learning systems 600a and 600b have been depicted in a cloud-based and device-based configuration, respectively, it is to be understood that various other arrangements are possible. For example, in a hybrid configuration, a portion of natural user interface engine 620 and/or natural interaction engine 630 may be implemented locally on learner device 610, and another portion may be accessed via network 650.

Figure 7:
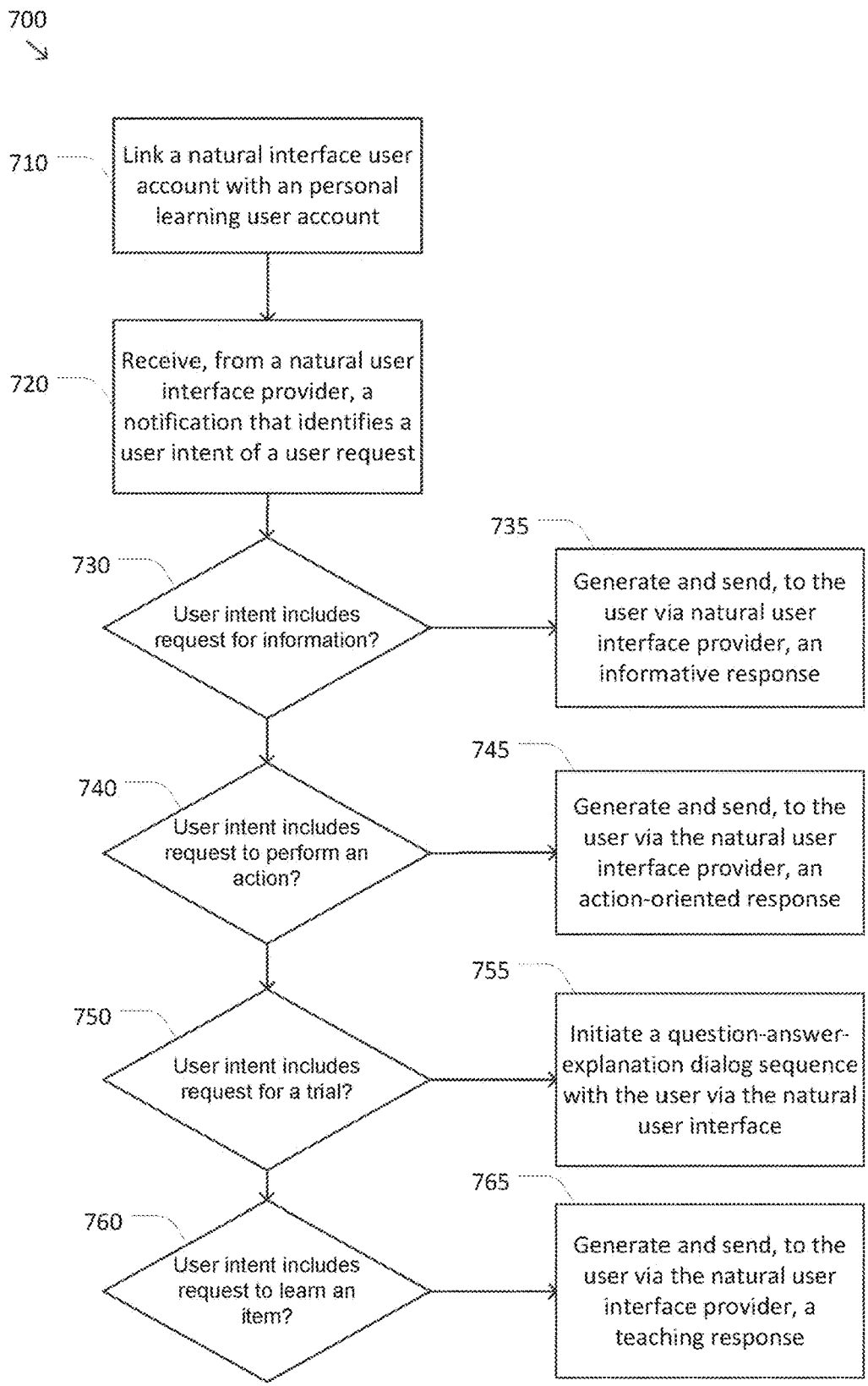
FIG. 7 is a simplified diagram of a method for providing a natural interaction with a learning system according to some embodiments.

FIG. 7 illustrates a method 700 for providing a natural interaction with a learning system according to some embodiments. According to some embodiments consistent with FIGS. 6A and 6B, method 700 may be performed by a natural interaction provider, such as natural interaction engine 630 of learning system 600a and/or 600b.

At an optional process 710, a natural user interface account is linked with a personal learning account. The natural user interface account may correspond to an account of a user of a learning device, such as learning devices 610-619, with a natural user interface provider, such as natural user interface engine 620. The personal learning account may correspond to an account of the user with an adaptive engine, such as adaptive engine 630. In order to allow the user to access the adaptive engine through the natural user interface provider, the natural user interface account and the personal learning account may be linked. For example, the user may provide credentials to the natural user interface provider to grant the natural user interface provider access to the personal learning account. In this manner, the natural interaction provider is able to generate responses to user requests that incorporate credential-protected information associated with the personal learning account of the user.

At a process 720, a notification that identifies a user intent associated with a user request is received from the natural user interface provider. In some examples, the notification is received over a network, such as network 650. In some examples, the notification may be formatted as a JSON and/or XML message. Receipt of the notification message may trigger one or more natural interaction handlers, such as natural interaction handlers 631-639, to process and respond to the notification message, as discussed below with respect to processes 730-760.

At a process 730, it is determined whether the user intent includes a request for information. When the user intent includes a request for information, method 700 proceeds to a process 735, in which an informational response is generated and sent to the user via the natural user interface provider. For example, a user may say, "System, can you access my account?" The natural interaction provider may provide an informative response that provides, "You last reviewed one day ago and you have thirty-nine fading memories. Use this mobile phone to refresh your fading memories." In another example, the user may say. "Can I have a study tip?" The natural interaction provider may generate an informative response that provides. "Don't cram. Little and often is the recipe for success." The user may say, "How is my Napa Valley set?" The natural interaction provider may generate an informative response that provides, "You are at level 4.1 with a goal of 5.0. You have 3 fading memories. It's time to refresh." In one or more of the preceding examples, the natural interaction provider may obtain the information that is included in the informative response from the adaptive engine via the network.

At a process 740, it is determined whether the user intent includes a request to perform an action. When the user intent includes a request to perform an action, method 700 proceeds to a process 745, in which an action-oriented response is generated and sent to the user via the natural user interface provider. The action-oriented response may include a confirmation that an action has been and/or will be performed, a prompt for user input, and/or the like. The action-oriented response may further include information relevant the requested action. For example, the user may say, "Can I do a trial now?" The natural interaction provider may generate an action-oriented response that provides. "Space exploration set is at level 0.8 with a goal of 2.0. You have four fading memories. Would you like to get started?" The user may respond, "Yes." In some examples, the natural interaction provider may transmit a notification of the requested action to the adaptive engine via the network.

At a process 750, it is determined whether the user intent includes a request for a trial. When the user intent includes a request for a trial, method 700 proceeds to a process 755, in which the natural interaction provider initiates a question-answer-explanation dialog sequence. The question-answer-explanation dialog sequence may be generated by retrieving one or more knowledge items and/or interactions provided by the adaptive engine. In an exemplary question-answer-explanation dialog sequence, the natural interaction provider may generate and send a question to the user. When the user responds with an answer attempt, the natural interaction provider may determine whether the answer attempt matches a correct answer to the question. The natural interaction provider may then provide an outcome-based explanation based on whether the user's answer attempt matches the correct answer. When the user's answer is correct, the natural interaction provider may generate and send response that congratulates the user and/or otherwise inform the user that the answer is correct. When the user's answer is fully or partially incorrect, the natural interface provider may generate and send a response that informs the user that the answer is incorrect, informs the user of the correct answer, informs the user how close or far the user's answer attempt is from the correct answer, guides the user to the correct answer, and/or the like. In some examples, the response may include additional explanatory information to reinforce the subject matter embodied in the question, such as an explanation of why the user's answer is correct or incorrect.

For example, the natural interaction provider may pose a question that provides, "What is the speed of light in kilometers per second?" The user may answer, "I think it's 290,000." In this example, the natural interaction provider may extract the answer attempt of "290.000" from the voice response of "I think it's 290,000." In some examples, the natural interaction provider may generate an explanatory response that provides, "That's very close. It's actually 300,000 kilometers per second." Notably, if the user responded. "186,000 miles per second." the explanatory response may include information that guides the user to a correct answer, e.g., "Can you provide that in kilometers per second?"

In the example above, the natural interaction provider performs the step of extracting the numerical value "290.000" from the sentence "I think it's 290,000." However, in some examples, the natural interaction provider may provide an answer template (e.g., answer slots) to the natural user interface provider for each question. The answer template indicates the expected or required format of the user's response, such as a numerical value, a multiple choice selection (e.g., "true," "false," "yes," "no." "A," "B." "C," or "D"), and/or the like. In this manner, the natural user interface provider, rather than the natural interaction provider, is responsible for extracting the user's answer from a particular user utterance and transmitting the answer to the natural interaction provider in the expected format.

In one example, at the end of a particular question-answer-explanation dialog sequence, the natural interaction provider may initiate one or more additional question-answer-explanation dialog sequences based on the outcome of the first trial and/or the availability of additional knowledge items and/or interactions from the adaptive engine. In one example, the natural interaction provider may generate and send a second question to the user: "Can you order the following planets from smallest to largest: Saturn. Earth. Jupiter. Mars?" The natural interaction provider may receive an answer attempt from the user via the natural user interface provider: "Earth, Mars, Jupiter, Saturn." In one example, the natural interaction provider may generate and transmit a correction that provides, "No, the correct order from smallest to largest is Mars, Earth, Saturn, Jupiter. Jupiter has a diameter 20 times larger than that of Mars."

At a process 760, it is determined whether the user intent includes a request to learn a knowledge item. When the user intent includes a request to learn a knowledge item, method 700 proceeds to a process 765, in which a teaching response is generated and sent to the user via the natural user interface provider. In some examples, requested knowledge item may correspond to knowledge item 118 and or structured learning assets 512. In one example, the teaching response may include a one or more of a natural response, such as conversational speech, and/or a preformed multimedia interaction (e.g., text, audio, video, and/or the like). For example, the teaching response may provide, "Let me show you a video of a leading expert in astronomy [the video may be played on the user device]." The video may provide, " . . . the length of the meter is defined from the speed of light and the international standard for time . . . "

In one example, the teaching response may include a follow-up evaluation to determine how well the user learned the knowledge item. In some examples, the follow-up evaluation may be in the format of a question-answer-explanation dialog sequence. For example, after showing the user the video of the astronomy expert, the natural interaction provider may pose a question to the user that provides, "Do you know what base unit of length is defined by the speed of light and the international standard of time?" The user may respond, "the meter." The natural interaction provider may respond. "Yes, that is correct."

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A learning system comprising:
a non-transitory memory; and
one or more hardware processors configured to read instructions from the non-transitory memory to cause the system to perform operations comprising:
generating a semantic model based on a source material using a machine learning algorithm;
assigning a plurality of concept scores to a corresponding plurality of concepts included in the source material, wherein each of the plurality of concept scores is assigned based on a relationship between a respective one of the plurality of concepts and the semantic model;
selecting one or more candidate knowledge items from the source material based on the plurality of concept scores;
generating an interaction based at least on the one or more candidate knowledge items; and
transmitting the interaction to a user device.

2. The learning system of claim 1, wherein the operations further comprise:
filtering the one or more candidate knowledge items based on user data to provide one or more filtered candidate knowledge items; and
generating the interaction based at least on the one or more filtered candidate knowledge items.

3. The learning system of claim 2, wherein
the filtering of the one or more candidate knowledge items based on the user data includes identifying one or more learning objectives of a user of the user device; and
the one or more learning objectives of the user correspond to a query provided by the user of the user device.

4. The learning system of claim 2, wherein
the filtering of the one or more candidate knowledge items based on the user data includes identifying one or more learning objectives of a user of the user device; and
the one or more learning objectives are generated automatically based on existing knowledge of the user.

5. The learning system of claim 4, wherein
the one or more learning objectives are automatically generated by comparing the existing knowledge of the user of the one or more candidate knowledge items with a predetermined threshold;
when the existing knowledge of the user of the one or more candidate knowledge items is greater than the predetermined threshold it is determined that re-learning of the one or more candidate knowledge items is not necessary.

6. The learning system of claim 2, wherein
the filtering of the one or more candidate knowledge items based on the user data includes identifying one or more learning objectives of a user of the user device; and
the one or more candidate knowledge items are filtered by determining a relevance score for each of the one or more candidate knowledge items and determining whether the relevance score meets a threshold.

7. The learning system of claim 2, wherein the operations further comprise:
generating user data that includes one or more metrics that indicate a level of retention or understanding of the one or more candidate knowledge items by a user of the user device; and
determining the one or more metrics based on the user's responses to one or more previous interactions.

8. The learning system of claim 7, wherein the one or more metrics are further determined based on historical user responses associated with other knowledge items or interactions.

9. The learning system of claim 1, wherein the source material includes at least one of a text, a video, an image, or audio content.

10. The learning system of claim 1, wherein the interaction includes a voice interaction.

11. The learning system of claim 1, wherein the one or more candidate knowledge items are selected adaptively to reduce redundancies among the one or more candidate knowledge items.

12. The learning system of claim 1, wherein
each of the plurality of concept scores indicates a level of relevance between a respective concept included in the source material and one or more learning objectives of a user of the user device; and
the plurality of concepts included in the source material are ranked based on the plurality of concept scores.

13. The learning system of claim 1, wherein the relationship is defined by a centrality metric that indicates how central a corresponding concept is to one or more topics in the semantic model.

14. The learning system of claim 1, wherein
the interaction transmitted to the user device is an interaction of a course;
the course is completed by a user of the user device in order to obtain a professional certification.

15. The learning system of claim 1, wherein the operations further comprise:
sending, to the user device, analytics data that indicate a performance result based on a respective response to the interaction by a user of the user device.

16. The learning system of claim 15, wherein the operations further comprise:
sending the analytics data to a device of an individual other than the user of the user device to inform the individual whether or not the user understands at least one of the one or more candidate knowledge items based on which the interaction was generated.

17. A method comprising:
generating a semantic model based on a source material using a machine learning algorithm;
assigning a plurality of concept scores to a corresponding plurality of concepts included in the source material, wherein each of the plurality of concept scores is assigned based on a relationship between a respective one of the plurality of concepts and the semantic model;
selecting one or more candidate knowledge items from the source material based on the plurality of concept scores;
generating an interaction based at least on the one or more candidate knowledge items; and
transmitting the interaction to a user device.

18. The method of claim 17, further comprising:
filtering the one or more candidate knowledge items based on user data to provide one or more filtered candidate knowledge items; and
generating the interaction based at least on the one or more filtered candidate knowledge items.

19. A non-transitory machine-readable medium having stored thereon machine-readable instructions executable to cause a machine to perform operations comprising:
generating a semantic model based on a source material using a machine learning algorithm;
assigning a plurality of concept scores to a corresponding plurality of concepts included in the source material, wherein each of the plurality of concept scores is assigned based on a relationship between a respective one of the plurality of concepts and the semantic model;
selecting one or more candidate knowledge items from the source material based on the plurality of concept scores;
generating an interaction based at least on the one or more candidate knowledge items; and
transmitting the interaction to a user device.

20. The non-transitory machine-readable medium of claim 19, wherein generating the interaction includes:
filtering the one or more candidate knowledge items based on user data to provide one or more filtered candidate knowledge items; and
generating the interaction based at least on the one or more filtered candidate knowledge items.

* * * * *